(12) United States Patent
Ma et al.

(10) Patent No.: US 10,594,124 B2
(45) Date of Patent: Mar. 17, 2020

(54) RETAINING STRUCTURE-BASED HEAT TRANSFER AND DISSIPATION SYSTEM AND WIND GENERATOR SET

(71) Applicant: XINJIANG GOLDWIND SCIENCE & TECHNOLOGY CO., LTD., Urumqi, Xinjiang (CN)

(72) Inventors: Shengjun Ma, Xinjiang (CN); Wanshun Ma, Xinjiang (CN)

(73) Assignee: XINJIANG GOLDWIND SCIENCE & TECHNOLOGY CO., LTD. (CN)

(*) Notice: Subject to any disclaimer, the term of this patent is extended or adjusted under 35 U.S.C. 154(b) by 0 days.

(21) Appl. No.: 15/550,066

(22) PCT Filed: Nov. 24, 2015

(86) PCT No.: PCT/CN2015/095449
§ 371 (c)(1),
(2) Date: Aug. 10, 2017

(87) PCT Pub. No.: WO2017/008425
PCT Pub. Date: Jan. 19, 2017

(65) Prior Publication Data
US 2018/0048135 A1 Feb. 15, 2018

(30) Foreign Application Priority Data
Jul. 10, 2015 (CN) .......................... 2015 1 0406531

(51) Int. Cl.
*H02G 3/00* (2006.01)
*H02G 3/32* (2006.01)
(Continued)

(52) U.S. Cl.
CPC ............... *H02G 3/32* (2013.01); *F03D 13/20* (2016.05); *F03D 80/85* (2016.05); *F16L 59/028* (2013.01);
(Continued)

(58) Field of Classification Search
CPC .... F03D 80/85; F03D 13/20; F05B 2260/231; H02G 3/03; H02G 3/00; H02G 3/32; F16L 59/028; F28F 13/18
See application file for complete search history.

(56) References Cited

U.S. PATENT DOCUMENTS

| 2006/0199411 A1 | 9/2006 | Singh et al. |
| 2010/0006710 A1 | 1/2010 | Lyness et al. |

(Continued)

FOREIGN PATENT DOCUMENTS

| CN | 101634282 A | 1/2010 |
| CN | 101939536 A | 1/2011 |

(Continued)

OTHER PUBLICATIONS

Machine translation of JP 2008298051 Kinoshita Jiro, (Year: 2008).*

(Continued)

*Primary Examiner* — Richard A Edgar
*Assistant Examiner* — Maxime M Adjagbe
(74) *Attorney, Agent, or Firm* — Frank Gao

(57) ABSTRACT

A retaining structure-based heat transfer and dissipation system and a wind generator set are provided. The heat transfer and dissipation system includes a envelop enclosure and power transmission cables that are laid along the vertical direction of the inner wall of the envelop enclosure. The power transmission cables are laid in a shady surface region of the envelop enclosure. The system effectively lowers the surface temperature of the power transmission cables in the envelop enclosure, prolongs the service life of the power transmission cables, and ensures the operation safety of power transmission. The over-temperature problem of the power transmission cables in a tower drum of the wind generator set in a high-temperature natural geographical environment is resolved in a "green" and "zero-energy consumption" manner, and the system safety of power transmission is improved.

19 Claims, 11 Drawing Sheets

(51) Int. Cl.
*H02G 3/03* (2006.01)
*F03D 13/20* (2016.01)
*F03D 80/80* (2016.01)
*F16L 59/02* (2006.01)
*F28F 13/18* (2006.01)

(52) U.S. Cl.
CPC .............. *F28F 13/18* (2013.01); *H02G 3/00* (2013.01); *H02G 3/03* (2013.01); *F05B 2260/221* (2013.01); *F05B 2260/231* (2013.01); *F28F 2245/00* (2013.01); *Y02E 10/722* (2013.01); *Y02E 10/728* (2013.01); *Y02T 50/675* (2013.01)

(56) References Cited

U.S. PATENT DOCUMENTS

| | | | |
|---|---|---|---|
| 2010/0247326 A1 | 9/2010 | Prebio | |
| 2011/0162865 A1* | 7/2011 | Ueno | H02G 11/00 174/79 |
| 2012/0047840 A1* | 3/2012 | Gregor | E04H 12/04 52/651.01 |
| 2014/0217741 A1 | 8/2014 | Christensen | |
| 2015/0068784 A1 | 3/2015 | Alefelder et al. | |

FOREIGN PATENT DOCUMENTS

| | | | |
|---|---|---|---|
| CN | 102828921 | A | 12/2012 |
| CN | 103184773 | A | 7/2013 |
| CN | 103362749 | A | 10/2013 |
| CN | 103378573 | A | 10/2013 |
| CN | 103850888 | A | 6/2014 |
| CN | 204402767 | U | 6/2015 |
| CN | 204720903 | U | 10/2015 |
| DE | 202013007659 | U1 | 12/2014 |
| EP | 2495439 | A1 | 9/2012 |
| EP | 2781673 | A1 | 9/2014 |
| JP | 2008-298051 | A | 12/2008 |
| JP | 2008298051 | * | 12/2008 |
| KR | 200343324 | Y1 | 4/2004 |
| KR | 100682325 | B1 | 2/2007 |
| KR | 20070070110 | A | 7/2007 |
| KR | 20090020843 | A | 2/2009 |
| KR | 101072294 | B1 | 10/2011 |
| KR | 20130030466 | A | 3/2013 |
| KR | 101358273 | B1 | 2/2014 |
| WO | 2008/102197 | A1 | 8/2008 |
| WO | 2013/182199 | A2 | 12/2013 |

OTHER PUBLICATIONS

Zhigang Wang; "Characteristics of large section cable laying in 220kv pujian station", Shanghai power, vol. 4, Sep. 25, 2008 pp. 377-379.

The Third Chinese Office Action dated Dec. 28, 2017; Appln. No. 201510406531.5.

Korean Office Action dated Apr. 21, 2016; Appln. No. 10-2015-0137656.

The First Chinese Office Action dated Jan. 4, 2017; Appln. No. 201510406531.5.

GBT50353-2013 "Code for calculation of building area of building engineering", GB National Standard, 11 pages, Issued on Dec. 19, 2013.

Internationai Search Report dated Apr. 6, 2016; PCT/CN2015/095449.

Written Opinion of the International Searching Authority dated Apr. 6, 2016; PCT/CN2015/095449.

The Second Chinese Office Action dated Jul. 31, 2017; Appln. No. 201510406531.5.

Extended European Search Report dated Apr. 11, 2018; Appln. No. 15898152.2.

* cited by examiner

RETAINING STRUCTURE-BASED HEAT TRANSFER AND DISSIPATION SYSTEM AND WIND GENERATOR SET

CROSS-REFERENCE TO RELATED APPLICATIONS

This application is a National Phase entry of PCT Application No. PCT/CN2015/095449, filed Nov. 24, 2015, which claims the benefit of priority to Chinese Patent Application No. 201510406531.5, titled "RETAINING STRUCTURE-BASED HEAT TRANSFER AND DISSIPATION SYSTEM AND WIND GENERATOR SET," filed with the Chinese State Intellectual Property Office on Jul. 10, 2015, the entire disclosures of which are incorporated herein by reference.

FIELD

This application relates to the technical field of power transmission, and in particular to a heat transfer and dissipation system and a wind power generator set based on an envelop enclosure.

BACKGROUND

In recent years, with continuous increase of capacity of a wind power generator set, the level of current transmitted by power transmission cables of a tower barrel of a wind power generator set becomes increasingly high, and the diameter and weight of the power transmission cables continuously increases. In design, current load estimation and heat accumulation situations caused by the current in a practical operation are concerns of manufacturers involved in whole machine design.

Generally, the power transmission cables of a switch cabinet of a generator in a cabin extend along power transmission cable grooves at a bottom of the cabin to an upper entrance of a tower barrel. Each of the power transmission cables is hung at the bottom of the cabin by "a power transmission cable hanging mesh". The power transmission cables are mounted in a manner shown in FIG. 1 and FIG. 2 from a hanging point in the cabin to a saddle surface. Power transmission cables 1 at the saddle surface 10 should also meet the bending requirement. The power transmission cables 1 are mounted in a hollow power transmission cable envelop ring, and extend to grooves in a prefabricated clamping plate for clamping the power transmission cables on the wall of the tower barrel after passing the saddle surface 10. This segment of power transmission cables will be generally twisted due to yawing of the cabin. The segment of the power transmission cables to the bottom of the tower barrel along the saddle surface will be fixed by the power transmission cable clamping plate. A distance between cylindrical power transmission cable bundles fixed by passing through holes in the power transmission cable clamping plate is more than 2.5 times of a cable diameter. As shown in FIG. 2, the power transmission cables 1 are laid downward along "a fixed circumferential position" of an inner wall of the tower barrel, and are fixed close to the wall of the tower barrel by segments.

In the conventional laying solution of the power transmission cables in the tower barrel, power transmission cables are divided into groups and then laid downward by means of the power transmission cable clamping plate at a fixed position on the inner wall of the tower barrel, and the position is close to a ladder fixed in the tower barrel simply for facilitating the mounting. However, in this case, the tower barrel is not considered as an envelop enclosure of a building industry, and the systematic heat dissipation is also not specially considered. Particularly, in summer, overheat issues of the power transmission cables are apt to occur, which may adversely affect the normal operation of the wind power generator set, reduce utilization rate of the wind power, and shorten a service life of the power transmission cables.

SUMMARY

A heat transfer and dissipation system and a wind power generator set based on an envelop enclosure for decreasing a surface temperature of power transmission cables in the envelop enclosure (such as a tower barrel) are provided according to embodiments of the present application.

In order to achieve the above object, the following technical solutions are provided according to the embodiments of the present application.

A heat transfer and dissipation system based on an envelop enclosure includes an envelop enclosure and power transmission cables, in which the power transmission cables are laid in a bending shape in a vertical direction.

A wind power generator set includes a heat transfer and dissipation system based on the envelop enclosure described above, in which the envelop structure is a tower barrel.

Under the guidance of the second law of thermodynamics (the essence of the second law of thermodynamics is to discuss directivity during a thermodynamics process and an objective law for energy quality degradation or depreciation; in addition to indicating a direction of a spontaneous process, the so-called directivity of the process includes conditions to implement a non-spontaneous process and a performed maximum limit of the process; the second law of thermodynamics indicates that, substance and energy in nature can only be converted in one direction, i.e., from utilizable to non-utilizable; the law discloses that during a process of energy conversion and transfer, it has directivity and conforms to an objective law of non-conservation of energy-quality; and all the thermodynamics processes should conform to both the first law and the second law of thermodynamics), the heat transfer and dissipation system and the wind power generator set based on the envelop enclosure according to the embodiments of the present application employs the envelop enclosure such as the tower barrel, utilizes the "cold source" with a low temperature at the "shady side inner wall surface" of the tower barrel and its close region, builds up a heat flow transfer system with decreasing temperature in a horizontal direction radially, which effectively reducing a surface temperature of the power transmission cables for power transmission in the envelop enclosure (such as the tower barrel), prolongs the service life of the power transmission cables, and ensures safe operation of the power transmission. The over-temperature issue of the power transmission cables in the tower barrel of the wind power generator set in a high-temperature natural geographical environment (such as a desert, a dry region, etc.) is addressed by a "green" and "zero-energy consumption" manner, and the system safety of the power transmission is improved.

BRIEF DESCRIPTION OF THE DRAWINGS

FIG. 10 and FIG. 11 are diagrams analyzing a heat transfer strengthening principle of the heat transfer and dissipation system according to the embodiment of the present application, in which, FIG. 10 is a side view showing power transmission cables and a wall of the tower barrel, and FIG. 11 is a radial front view of the power transmission cables and the wall of the tower barrel;

Figure 1:
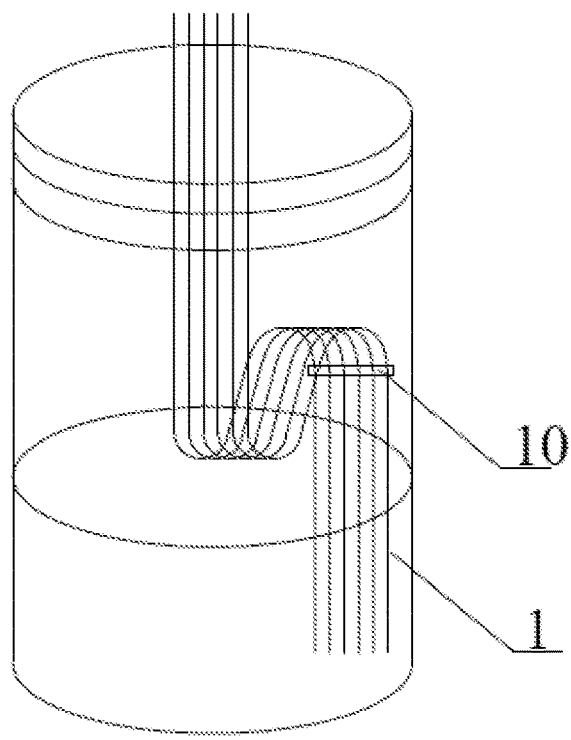
FIG. 1 and FIG. 2 show a typical laying solution of power transmission cables in a tower barrel of a wind power generator according to the conventional technology.
Figure 2:
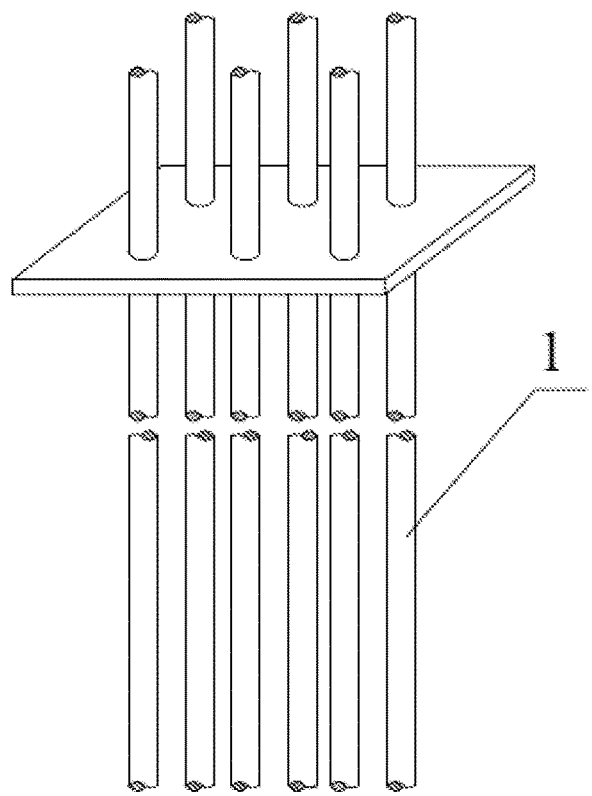

COLLECTION OF REFERENCE NUMERALS 1 power transmission cables,
2 electrical device,
3 heat radiation absorption coating,
4 second thermal insulation layer,
5 tower barrel,
6 first thermal insulation layer,
7 thermal radiation and dissipation coating,
8 triangular neutral region,
9 clamping plate,
10 saddle surface,
11 first inclined sub-segment,
12 second inclined sub-segment,
13 transition sub-segment.

DETAILED DESCRIPTION OF EMBODIMENTS

Firstly, analysis on an application environment of the present application and key ideas of the present application based on study of the inventor are illustrated.

1. Analysis on Heat Environment of an Envelop Enclosure, Such as a Tower Barrel

Figure 3:
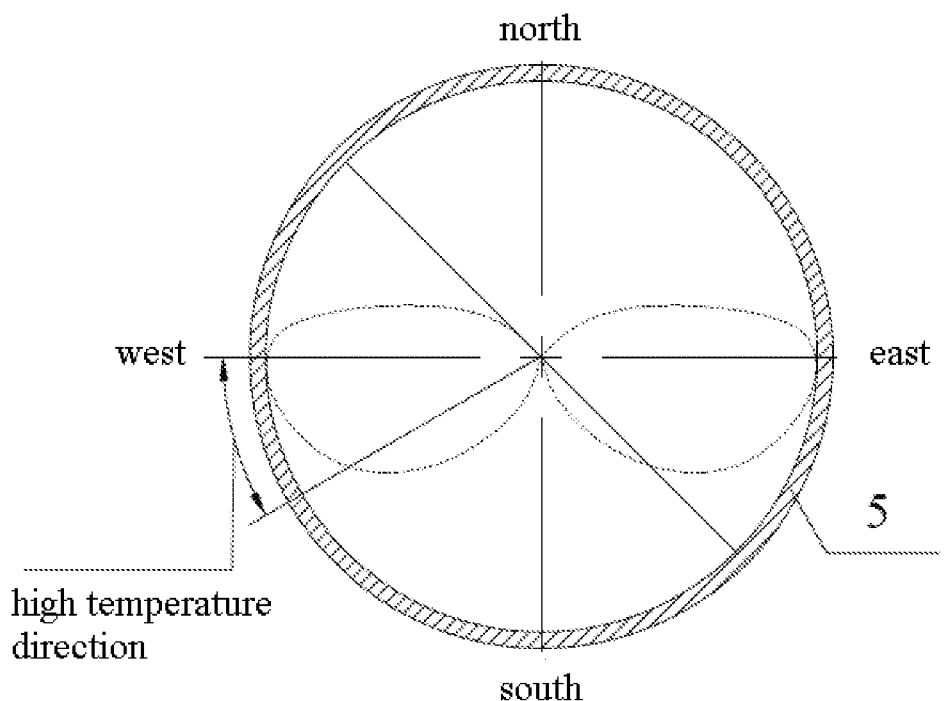
FIG. 3 shows a direction range in which a tower barrel as an envelop enclosure presents a high temperature in summer.

For the conventional technology that in the conventional laying manner of the power transmission cables below a saddle support in an existing wind power generator set and study on the "orientation" in a circumferential direction for facilitating heat dissipation and cooling for a heat source is not employed specially, the inventor firstly proposes that: before building a wind farm locally, meteorological data are required to be acquired and daily radiation quantities, i.e., daily radiation quantity values for various orientations (directions) such as east, south, west and north and right above, of an installation region in summer is required to be measured actually, and a curve of dumbbell-shape shown in FIG. 3 is drawn, and a centripetal radial size indicates a sun radiation quantity of a position where the tower barrel of the wind generator is located in each orientation.

FIG. 3 is a representative schematic diagram of the change of a daily radiation quantity in an external periphery of a tower barrel of a vertical wind power generator set in summer drawn according to meteorological data of a geographical environment of a wind plant at a certain place in part of China within the northern hemisphere. The change of the daily radiation quantity is shown by a dotted-line in FIG. 3, and radial amplitudes (length) in different positions represent intensities of radiation at which the sun irradiates to a wall of the tower barrel at corresponding tower barrel directions and periods.

It may be seen from FIG. 3 that, from a position by rotating clockwise about 60 degrees from south to west, a high temperature starts to present. The high temperature lasts till reaching the right west, and after that the radiation intensity starts to decline. No radiation from the sun can be directly obtained at the right north of the geographical position, which only has a ground surface radiation and an atmosphere radiation, i.e., an environmental radiation, and these exhibits a weak magnitude, and thus building a bridge may be utilized, and building a bridge from inwards to outwards for transferring a heat flow towards the north direction is just one of inventive concepts of the present application.

According to the substance migration rule, flux (heat flow)=pushing force during substance migration process (temperature and pressure)/resistance (heat resistance), which is the key guiding idea of the present application. In the tower barrel, particularly at the bottom of the tower barrel, a generator set converter, a reactor, a transformer (including a transformer supplying auxiliary power to the generator set and a transformer connected to a power grid to output electrical energy) and power transmission cables are arranged, which are all heat sources and have a surface temperature much higher than a temperature at a north side of the wall surface of the tower barrel. Therefore, since there are temperature differences between the above heat sources and the external wall of the tower barrel in the radial direction, the heat sources are arranged and a heat flow radial transfer channel is built such that air in a range of a wider circumferential arc length inside the tower barrel wall at a shady side is bought into participating the heat absorption from the power transmission cables and dissipating heat towards the inner wall of the tower barrel with the wider circumferential arc length by a newly created structure, that is, a cold source for absorbing heat from the heat source during a natural convection heat transfer process is increased significantly (referring to FIG. 11, a width of $L_1$ is at least two times of a width or arc length in the conventional technology). According to the newton cooling law, as a heat exchange area is increased, a heat exchange speed is increased. Heat dissipation of the heat source is enhanced, which forms a second inventive concept of the present application.

The inventor firstly cites a specialized term of "envelop enclosure" from "Specification for calculating building area in building project" GB/T50353-2005 into the wind power generator set, and regards the "tower barrel" as a part of the envelop enclosure of the wind power generator set. It is stipulated in "Specification for calculating building area in building project" GB/T50353-2005 that, the envelop enclosure refers to a wall, a door and a window and so on, which enclose a building space, forming members of the building space to defend adverse influence from the environment (also including some accessories). The envelop enclosure includes two parts: a transparent part and an opaque part. The opaque part includes a wall, a roof and a floor and so on, and the transparent part includes a window, a skylight and a balcony door and so on. According to the position of the envelop enclosure in a building, the envelop enclosure includes an external envelop enclosure and an internal envelop enclosure. The internal envelop enclosure, such as a partition wall, a floor and an inner door window, has a function of dividing an indoor space, and should have performances of sound insulation, sight insulation and meet certain particular requirements.

The envelop enclosure generally refers to an external envelop enclosure such as an external wall, a roof, and so on. The external envelop structure includes an external wall, a roof, a lateral window and an external door and so on, for resisting wind and rain, temperature change and sun radiation and so on, and should have performances of heat preservation, heat insulation, sound insulation, waterproof, moisture-proof, fire-resistant and durability. Materials of the external envelop enclosure include a brick, a stone, soil, concrete, a fiber cement board, a steel plate, an aluminum alloy plate, glass, glass fiber reinforced plastic and plastic and so on. According to the construction, the external envelop enclosure may include a single-layer envelop enclosure and a multi-layer composite envelop enclosure. The single-layer envelop enclosure includes a brick wall, a concrete wall, a pressed metal plate wall, an asbestos cement board wall and a glass plate wall and so on in various thicknesses. According to different requirements and material performances, the multi-layer composite envelop enclosure may be arranged in layers. Generally, an external layer is a protective layer, a middle layer is a heat preservation or a thermal insulation layer (a steam insulation layer may be further provided if necessary), and an inner layer is an inner surface layer. For the layers, a framework or an intensified inner protective layer functions as a support structure.

Here, the inventor firstly recognizes the specialized term of "envelop enclosure", and cites it in study of the energy-saving and consumption-reducing technology of the wind power generator set. It is necessary, accurate and appropriate to regard the "tower barrel" as a part of the envelop enclosure of the wind power generator set.

The referring of the specialized term of the "envelop enclosure" in study of the energy-saving and consumption-reducing technology of the wind power generator set has the following usages.

The measuring diagram of a daily radiation quantity from the sun in various orientations of the place where the "envelop enclosure" of the tower barrel is located is attempted to be creatively used to determine "orientation and location" of a main power transmission cable in the tower barrel for laying the main power transmission cables downwards in the tower barrel wall, and functions as a main physical basis for determining the "orientation and location". A region where the power transmission cable is laid and arranged is determined as a region which is located at the north by east of the circumferential radian of the vertical tower barrel, and the region just refers to a place close to an inner wall of a "shady side" of the tower barrel wall in a building industry.

In the present application, a "sunny side" of a building mainly refers to a sunny south side (in the northern hemisphere) and then includes an east side and a west side which may be irradiated by the sun; and a "shady side" of the building mainly refers to a north side which cannot be irradiated by the sun (in the northern hemisphere).

During a radial heat transfer process of a body of a tower barrel wall of the wind power generator, radiation heat exchange is an important manner for heat transfer, which includes transfer of sun radiation on a surface of the tower barrel and heat radiation exchange between inner surfaces of the tower barrel. Although the radiation heat exchange directly influences temperatures inside and outside the envelop enclosure, it is not easily to be observed by people compared with the air temperature.

The sun radiation reaches an external surface of the tower barrel body by direct radiation and scattering. On the surface, energy property conversion occurs: the radiation energy is converted into heat energy and is then transferred to an anticorrosive coating of the inner wall of the tower barrel by heat conduction. If the temperature on the surface is higher than an air temperature in the tower barrel, the surface releases the heat into the air. More importantly, various power devices, such as a power transmission cable, a transformer, a converter, and a power compensation device and other heat generation sources are arranged in the tower barrel. The closed envelop enclosure in the tower barrel has a heat storage capability. In summer, the tower barrel inner wall keeps heating the air therein in a rising direction, that is, a height direction, in a natural convection heat exchange manner. A case of flowing not caused by an external drive force is referred to as a natural convection or a free flow. The inherent power causing such a flowing of the fluid is a temperature difference or a concentration difference (between components) of the fluid. The latter belongs to a mass transfer problem. In summer, air in the tower barrel is heated continuously by the inner wall of the tower barrel or heated by an inner heat source, resulting in an air temperature difference in the tower barrel. A buoyancy lift causing the natural convection is actually caused by a joint effect of a density gradient of the fluid and a volume force proportional to the density gradient. In a range of a gravitational field of the earth, the most common volume force is gravity. There is no centrifugal force caused by a rotatory movement in the tower barrel, therefore the density gradient of the air is caused by the temperature difference.

The radiation heat of the sun reaches a maximum value at 2:00 or 3:00 PM (referring to FIG. 4 and FIG. 5), subsequently, the temperature decreases as the radiation heat of the sun decreases, and the temperature reaches a minimum value at a next 4:00 or 5:00 Am (referring to FIG. 4 or FIG. 5). Obviously, in a period of time, the heat change of the temperature may be regarded as periodically fluctuating by taking 24 hours as a period. At noon, the tower barrel is heated continuously by the radiation of the sun, and the air temperature is high, thus less heat is dissipated by convective heat exchange between the air and the outer wall of the tower barrel, and much heat energy is effectively absorbed by the outer wall of the tower barrel.

Figure 4:
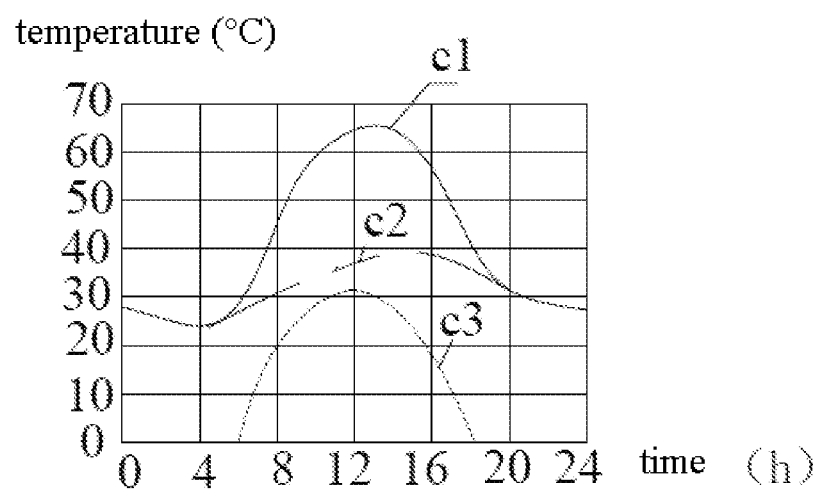
FIG. 4 shows a distribution of an external comprehensive temperature of the tower barrel as the envelop structure in summer.

FIG. 4 shows a change case of a representative daily temperature of an environment outside the tower barrel in summer according to a natural environment meteorological data of a vertical wind power generator set at a certain place of China in the northern hemisphere, in which, a curve c1 indicates a comprehensive temperature outside the tower barrel, a curve c2 indicates an air temperature outside the tower barrel, and a curve c3 indicates an equivalent temperature of the sun radiation. During outdoor climate conditions for calculating heat about a building in summer, the sun radiation and the air temperature outside the tower barrel are most important. Although the heat exchanging manner of the sun radiation with the outer coating of the cabin is different from the heat exchanging manner of the air outside of the tower barrel with the outer coating of the tower barrel, their effects are both to increase the temperature of the outer coatings of the tower barrel and the cabin. For simplifying calculation, the radiation heat of the sun is converted (the equivalent temperature of the sun radiation), and an assumed $t_{sa}$ indicating "a comprehensive temperature outside the tower barrel and the cabin" is used to replace the joint effects of both the sun radiation and the air temperature outside the tower barrel, that is, the curves c2 and c3 are superposed to form the curve c1.

Figure 5:
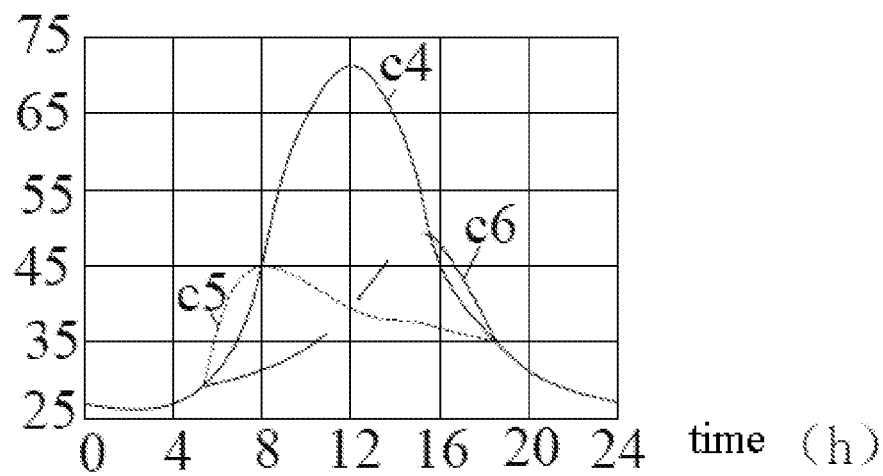
FIG. 5 shows a curve indicating comprehensive temperatures at an outer periphery of the tower barrel as the envelop structure in different orientations.

FIG. 5 shows a change case of a representative daily temperature of different directions of envelop enclosure of a tower barrel and a cabin in summer, according to a natural environmental meteorological data at a vertical wind power generator set. Curves c4, c5 and c6 indicate comprehensive temperatures for a horizontal surface, an east vertical surface and a west vertical surface respectively.

It may be seen from FIG. 5 that, a comprehensive temperature at the top of the cabin is continuously higher than temperatures of the east vertical surface and the west vertical surface of the envelop enclosure of the tower barrel and the cabin from 8:00 to 14:00; by taking 12:00 as a symmetric point, the external environment at the top of the cabin is continuously in a high comprehensive temperature;

eight hours later, a temperature of the west vertical surface of the envelop structures of the tower barrel and the cabin is higher than a temperature of the east vertical surface; and the temperature of the west vertical surface reaches a maximum value at 16:00, since a temperature wave is transferred to the inner walls of the tower barrel and the cabin with a delay of half of one hour to one hour, wherein the delay relates to materials of the tower barrel and the cabin and a heat storage coefficient of a coating material, and the heat storage coefficient determines the delay extent of a high temperature in the envelop enclosure. In a certain wind farm in hami area at a south slope of the Tianshan mountain of Sinkiang, in summer, the geographic location determines that wind generally blows after 18:00, leading the wind power generator set to generate power at a full power till the early morning of the next day. This means that heat generated by the heat sources in the wind power generator set "increases" continuously, and declining of an external environment temperature will not influence an internal environment temperature of the generator set immediately. It is necessary to "build a bridge" by means of a functional coating of an inner wall, at a north side, of the tower barrel, so as to absorb heat generated by the power transmission cables and the electrical devices, such that heat is dissipated radially.

In summary, a sunny side of the tower barrel wall is heated by continuously receiving the high radiation of the sun at noon and after noon, heat is transferred to the inner wall via the tower barrel, causing a temperature of the inner wall to increase. Heat exchange is performed between the inner wall and the air in the tower barrel. The higher the temperature of the inner wall of the tower barrel is, the higher the temperature of the air in the tower barrel heated by the heat source is. A temperature of the electrical devices in the tower barrel may exceed an upper limit, and thus there is a potential risk for safe operation of the electrical devices.

2. Key Ideas of the Present Application

In the case that the power transmission cables below the saddle support is determined to be laid downwards in an "orientation (position)" in an inner wall of the tower barrel, and a key idea of a next implementation method includes the following two aspects.

(1) Multiple power transmission cables hanging down in parallel occupy a limited circumferential arc length or a circumferential width close to an inner wall of the tower barrel, and a corresponding circumferential arc length or a corresponding circumferential width facing the tower barrel wall is also limited; and the air contained in a space between the group of the power transmission cables hanging down in parallel and the tower barrel wall is less as well. When the power transmission cables generates heat themselves, hot air close to a surface of the power transmission cables moves upwards due to a buoyancy lift; during the moving process, an area of cool air close to the wall surface of the tower barrel in a circumferential arc which may be caused to move and mix is small, a great "capacitive" "cold source", i.e., a shady side wall of the tower barrel and an inner surface thereof with a relatively low temperature (lower than a sunny side by 5 to 10 Celsius degrees) and the air nearby with a low surface temperature do not function completely. Here, the "capacitive" refers to a capability of receiving and loading the heat, and the "cold source" is a special term in thermal of physics. The power transmission cables and the electrical devices are "heat sources", the "heat sources" can transfer energy to the "cold source" spontaneously, and a heat transfer path with a high heat transfer speed is to be built between the "heat sources" and the "cold source", and the heat transfer path relates to a magnitude of a heat transfer resistance.

The core of the present application is to create a new structure with a heat resistance less than the in heat resistance the conventional technology by means of a new laying path of the power transmission cables and a shady side wall of the tower barrel and an internal surface thereof. Specifically, more air with a relatively low temperature (i.e., in a greater circumferential arc length or a circumferential width) on the shady side inner wall of the tower barrel is caused to participate in "natural convection heat exchange" (a term in heat transfer theory) with the power transmission cables. That is, a wider range of the shady side of the tower barrel wall and the internal surface thereof are utilized, the "cold source" has a capability or potential to absorb more heat and has a capability of transferring heat in a horizontal direction radially, therefore the "cold source" is to be developed and used. For this point, no concern is made by the technical personnel before.

(2) In a process of extending upward (the top of the tower barrel) of the power transmission cables 1, how to significantly reduce interference on cooling a surface of the power transmission cables by cold air flow at an upper segment of the power transmission cables caused by the heated air flow on the surface of the lower segment of power transmission cables in a rising process. After being transitioned via the saddle surface to a groove of a prefabricated clamping plate on the tower barrel wall, the power transmission cables 1 are laid downward vertically in parallel with the inner surface of the tower barrel, in the conventional manner. During an extending process from bottom to top (the top of the tower) of the power transmission cables, the heated air flow on the surface of the lower segment of the power transmission cables significantly interferes with the cooling on the surface of the power transmission cables by the cold air flow at an upper segment of the power transmission cables in rising, thereby aggravating an "wrapping around" effect to the power transmission cable. That is, a key idea of the solution put forward by the inventor is how to reduce negative influence of natural convection heat exchange on the upper segment of the power transmission cables caused by the lower segment of the power transmission cables.

Hereinafter a heat transfer and dissipation system based on an envelop enclosure according to embodiments of the present application is described in detail in conjunction with drawings.

First Embodiment

As shown in FIG. 6 to FIG. 9, a heat transfer and dissipation system based on an envelop enclosure according to this embodiment includes an envelop enclosure and power transmission cables 1 laid along an inner wall of the envelop structure. The power transmission cables 1 are laid in a bending shape in a vertical direction. Preferably, the power transmission cables 1 are laid in a region close to a shady side inner wall of the envelop enclosure.

In this embodiment of the present application, the "bending shape" should be understood as a shape extending in a polyline, a curve or a combination path of the polyline and the curve repeatedly in a circumferential direction from bottom to top, which is different from the shape extending substantially linearly from bottom to top in the conventional technology.

In the embodiment, a cross section in a horizontal direction of the envelop enclosure is a circular tower barrel 5. In other embodiments, the envelop enclosure may be buildings in other types of shapes.

The power transmission cables 1 are configured to transmit current, which will generate heat. The larger the current is, the more the heat amount is generated. The heat generated by the power transmission cables 1 is required to be dissipated in a timely manner, so as to ensure the power transmission cables 1 to be operated in a normal temperature range.

The power transmission cables 1 are laid as a bending shape, such that more air with a relatively low temperature (i.e., in a greater circumferential arc length or circumferential width) close to the inner wall of the tower barrel 5 may participate in "natural convection heat exchange" around the power transmission cables 1, thereby increasing a heat dissipation speed of the power transmission cables 1 and reducing a temperature of the power transmission cables 1.

As analyzed above and measured practically, under the sun radiation, a temperature of a shady side region in the tower barrel 5 is lower than a temperature of a sunny region by 5 degrees to 10 degrees. In this embodiment, the power transmission cables 1 are laid in the shady side region of the tower barrel 5, such that a temperature difference between the power transmission cables 1 and air around the power transmission cables 1 and a temperature difference between the power transmission cables 1 and the inner wall of the tower barrel 5 are increased. In combination with the bending shape arrangement of the power transmission cables 1, a heat dissipation speed of the power transmission cables 1 to the shady side inner wall of the tower barrel 5 can be significantly improved and the temperature of the power transmission cables 1 is reduced.

Specifically, as shown in FIGS. 7 to 11, the power transmission cables 1 are arranged as a saw shape and bend repeatedly downward with a predetermined turning angle θ. The "zigzag" trajectory is from top to bottom. A "peak point" or "turning point" may present on both a left side and a right side. Regardless of the "turning point" or "peak point" on the left side or the right side, a triangular neutral region 8 presents between two turning points on a same side. The so-called "triangle" refers to that two turning points on the same side and another turning point located between the two turning points on the same side, i.e., three points, form a triangle. The "triangular neutral region 8" presents periodically and alternately in a leftmost side (such as an MBS region) and a rightmost side (such as a DEG region) of multiple power transmission cables 1 laid downward and in parallel. At the turning points, the power transmission cables 1 are fixed by means of a clamping plate 9. Preferably, at least another clamping plate 9 for clamping the power transmission cables 1 is further provided between every two turning points. The power transmission cables 1 between two adjacent clamping plates 9 are linear. The fixing manner by the clamping plate belongs to the conventional technology. However, in this embodiment, the power transmission cables 1 extend in a bending shape of zigzag, which differs from the conventional technology in the following aspects.

(1) Two vertically adjacent clamping plates 9 are located in different orientations and positions in the circumferential direction of the wall of the tower barrel 5 (different from the conventional manner, i.e., not in a vertical line).

(2) Clamping plates 9 at two adjacent turning points are not at the same circumferential position of the wall of the tower barrel 5.

(3) The power transmission cables 1 between clamping plates at two adjacent turning points may be divided into multiple bending line segments and fixed by multiple clamping plates 9; therefore, the power transmission cables 1 between two adjacent turning points may include multiple "bending line segments", which is not a line but is an approximate arc segment extending downward surrounding an arc inner wall of the tower barrel 5.

Figure 11:
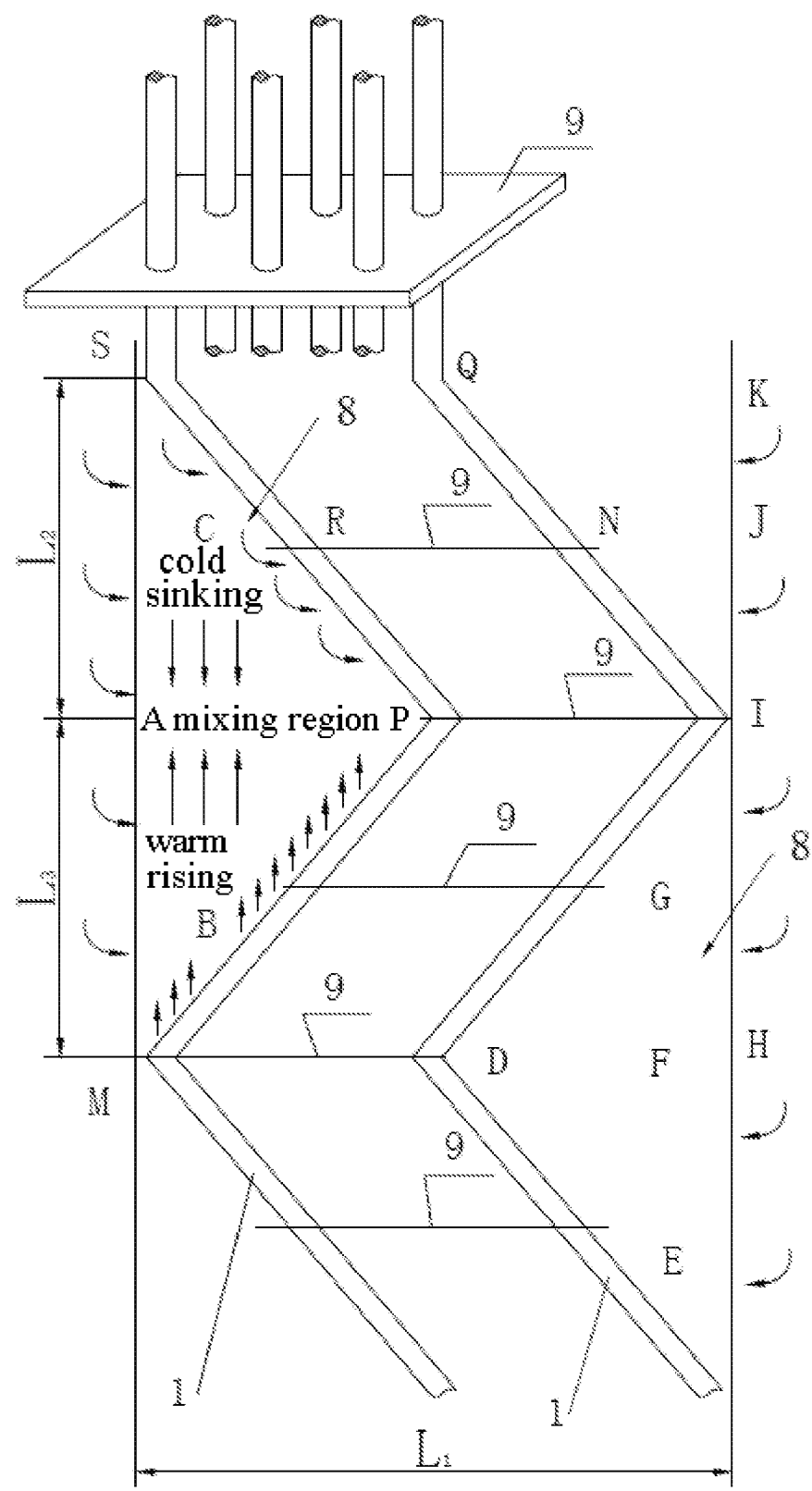

(4) The "triangular neutral region 8" presents between two adjacent turning points on the same side, and the region is defined by the inventor as a "cold region" according to air physical conditions at the wall surface and the boundary of the tower barrel 5. The "cold region" performs special functions. Hot air rising due to a buoyancy lift after being heated by a lower segment of the power transmission cables 1 (in FIG. 11, power transmission cables 1 adjacent to a right side of letters MP, or power transmission cables 1 adjacent to a left side of letters DE) from the bottom is mixed with "cold air" therein at a "cold region" (upper and lower, and front and back about the level of letters AP or DFH), and the "cold air" originally at the "cold region" sinks. During the mixing process, as the rising hot air performs "natural convection heat exchange" with the cold inner wall of the tower barrel 5, the temperature of the hot air decreases, therefore, the buoyancy lift suffered by the hot air originally from the lower power transmission cables 1, i.e., the power transmission cables 1 adjacent to the right side of letters MP or the power transmission cables 1 adjacent to the left side of letters DE in FIG. 11, is reduced as well, and generally will not "interferer" with the intensity of natural convection heat exchange performed between the upper segment of the power transmission cables 1 and the cool air at about the same level and mixing with the hot air to exchange heat. Here, the "interfering" the upper power transmission cables 1 refers to that: the rising hot air wraps the upper power transmission cable 1, which is bad for the cold air around the power transmission cables 1 to drop and "replace" the surface hot air to perform "natural convection heat exchange". As shown by four bending arrows between a position S and a position P in FIG. 11, the four bending arrows turning downward and then turning right indicate that: the air around the power transmission cables 1 fills a gap generated after the hot air flow rises, contacts continuously with the power transmission cables 1, and cools a surface of the power transmission cables 1 by the manner of natural convection heat exchange. The same physical process occurs on a surface of the segment of the power transmission cables 1 indicated by a region DI.

It should be noted here that, the bending radian of the clamping plates 9 at the two vertically adjacent turning points relative to the power transmission cables 1 conforms to the bending radius requirements in the industry, and meets the thermal expansion and stretching requirements, which are not analyzed here.

Figure 10:
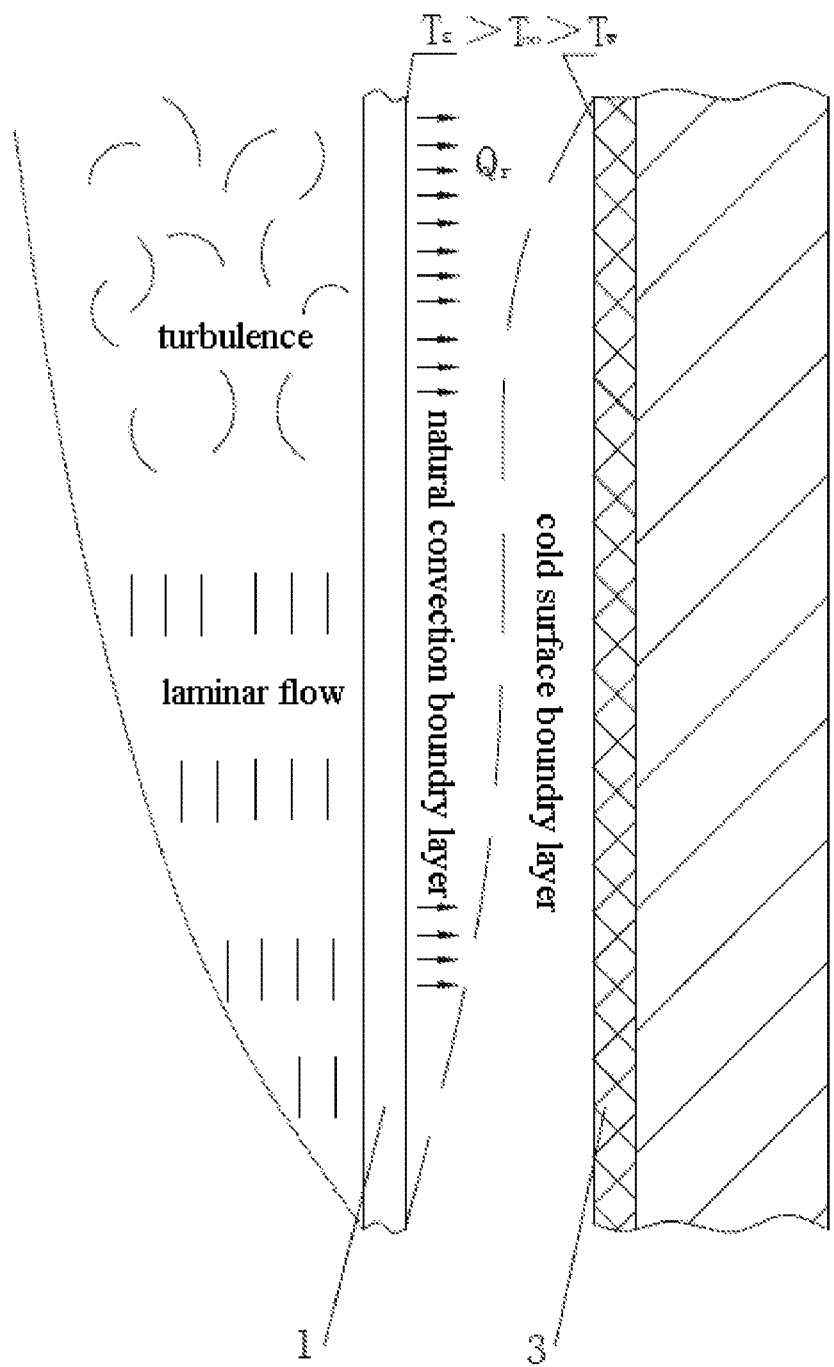

As shown in FIG. 10, an inner wall surface of the tower barrel 5 has a low temperature, there is a "cool surface boundary layer", and air is contained in the boundary layer. In the side view, a projection of the power transmission cables 1 is substantially parallel with the wall of the tower barrel 5, thereby facilitating observing air moving conditions between the power transmission cables 1 and the wall of the tower barrel 5, and, the surface boundary layer of the tower barrel 5. Here the "boundary layer" is a term of fluid dynamics and heat transfer theory (convective and heat transfer major). The natural convection boundary layer at the right side of the power transmission cables 1 gradually becomes thicker in a height direction, and the heated air rises naturally. The wall surface boundary layer of the tower barrel 5 (referred to as "the cold surface boundary layer") gradually becomes thinner in an upward direction, that is, gradually becomes thicker in a downward direction. A density of the air is relatively large, and then the air sinks naturally. The "rising air" and the "sinking air" rotate clockwise as a whole between the outer surface of the power transmission cables 1 and the wall of the tower barrel, and rotate clockwise partially. The arrangement manner in the present application differs from the conventional arrangement manner in that (invention feature-cooling physical structure feature): the upper intersecting "boundary layer" extends upward, enters the "cold region", and is also cooled by the "natural convection heat exchange" of the wall surface of the tower barrel 5 in the "cold region". That is, the cold inner wall surface of the tower barrel 5 is utilized again. The hot air heated by the lower power transmission cables 1 is controlled in corresponding line segments (mixed air of cold and hot air close to a level of corresponding regions indicated by letters AP and letters DFH), i.e., between two vertically adjacent turning points (regions indicated by letters MS).

In this embodiment, the tower barrel 5 is of a cylindrical wall shape, therefore the "zigzag" trajectory of the power transmission cables 1 is three-dimensional, which presents a saw shape bending and twisting repeatedly, and has structural characteristics of a torsion structure, a fold line structure, a non-vertically overlapping structure, a new structure that the "cold regions" (vertically in a region at a width $L_1$ and dozens of meters below a saddle support) present periodically and alternately in the left and right, with the area of the "cool regions" being controllable. In the "saw shape bending and twisting repeatedly", the "repeatedly" indicates bending to left or right periodically on the shady side inner wall arc surface of the tower barrel 5; and the "twisting" refers to that multiple power transmission cables 1 are not located in the same arc surface, in a circumferential direction, of the wall of the tower barrel 5 due to bending left and right, causing that two adjacent clamping plates 9 are not in the same line vertically, that is, the circumferential locations of the two clamping plates 9 change (leftwards or rightwards), and present twisting.

Figure 12:
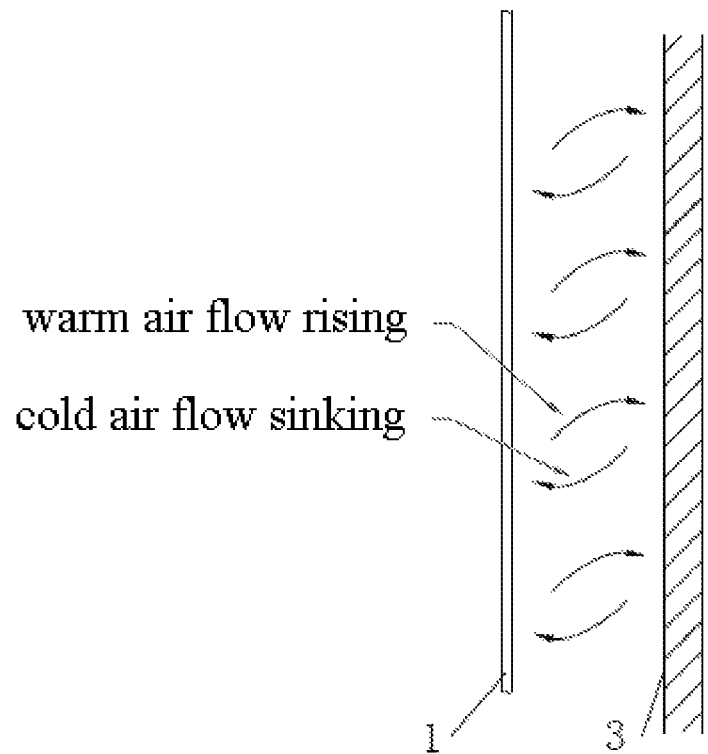
FIG. 12 illustrates that two types of boundary layers for the power transmission cables and the wall of a tower barrel in are heat transfer and dissipation system according to the embodiment of the present application interacting with each other to strengthen heat exchange.

As shown in FIG. 11 and FIG. 12, heat exchange effects at the turning points change periodically. For example, the heat exchange effects at "P" and "D" are weak, and the heat exchange effects at "M" and "1" are strong. During a downward extending process, heat exchange intensities of the turning points (at the turning positions) change periodically. In a height direction of the tower barrel 5, an inner diameter of the tower barrel 5 gradually decreases, causing that a region "MDGB" and a region "BGIP" are not at a same plane in the vertical direction, that is, top views of the two regions in the height direction do not overlap, and the "path lines" (basic term in fluid dynamics) of the rising air due to the buoyancy lift do not overlap, either. In this way, from the view of effect, the rising air flow from the lower power transmission cables 1 may sweep the upper power transmission cables 1 with a low overlapping degree, which has reduced adverse effect.

FIG. 11 and FIG. 12 also indicate another view from the effect that: the power transmission cables 1 extend non-vertically, and twisting presents in "adjacent local segments" in the vertical direction, and the inner diameter of the wall of the tower barrel decreases in the upward direction, which causes that the hot air flow generated by the lower power transmission cables 1 may directly sweep the wall of the tower barrel 5 upward. In this case, the "zigzag line twisting trajectory", after spreading in the circumferential direction of the wall of the tower barrel 5, obtains a chance to contact with the cold wall surface in a great width range, and the contact area is increased by more than two times. The increasing value of the contact area is determined by a predetermined turning angle $\theta$ of the power transmission cables 1.

In this embodiment, preferentially, the predetermined turning angle $\theta$ preferably is larger than or equal to five degrees and smaller than or equal to ten degrees.

Figure 9:
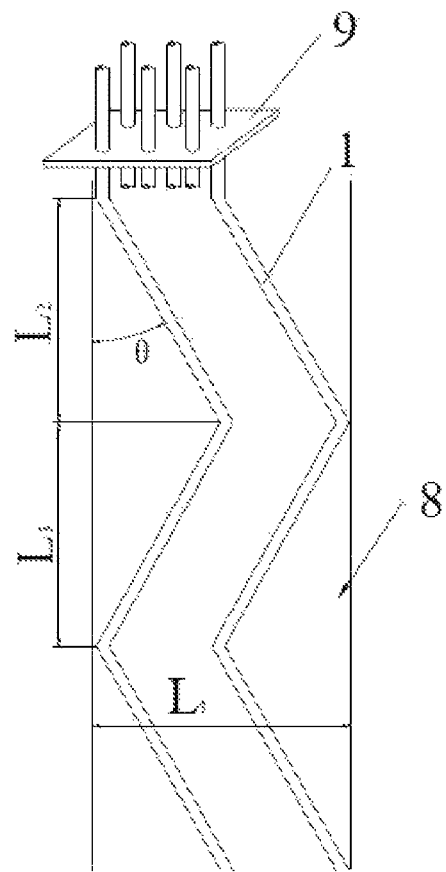
FIG. 9 schematically shows a laying solution of the power transmission cables in a heat transfer and dissipation system according to a first embodiment of the present application.

Table 1 indicates a length increase percentage of the power transmission cables 1 with different predetermined turning angles $\theta$ as compared with the vertical linear power transmission cables 1 in the conventional technology. As shown in FIG. 9, the length of the local actual power transmission cables 1 is approximately equal to $L2/\cos\theta$. It may be seen from table 1 that, even if $\theta$ is up to 10 degrees, the total length only increases for about 1.6%, not too much.

Thus, obviously, the increased cost of the power transmission cables 1 should not be a big concern.

TABLE 1

| θ | 5° | 6° | 7° | 8° | 9° | 10° |
|---|---|---|---|---|---|---|
| Cos θ | 0.996 | 0.994 | 0.992 | 0.990 | 0.987 | 0.984 |

Table 2 shows increased multiples of a circumferential arc length (L2·tgθ) of the power transmission cables 1 in the cold region with different predetermined turning angles θ and increased multiples of the natural convection heat exchange area caused accordingly (taking a distance between two vertically adjacent turning points L2=5000 mm and an original circumferential arc length of the power transmission cables 1 L=600 mm for instance).

TABLE 2

| θ | 5° | 6° | 7° | 8° | 9° | 10° |
|---|---|---|---|---|---|---|
| tgθ | 0.087 | 0.105 | 0.123 | 0.140 | 0.158 | 0.176 |
| L2 · tgθ | 8.7% · L2 | 10.5% · L2 | 12.3% · L2 | 14% · L2 | 15.8% · L2 | 17.6% · L2 |
| 5000 tgθ (mm) | 435 | 525 | 615 | 700 | 790 | 880 |
| contact arc length of cold wall surface (mm) | 1035 | 1125 | 1215 | 1300 | 1390 | 1480 |
| increased multiple of contact circumferential arc length arc of cold wall surface | 1.72 | 1.875 | 2.025 | 2.167 | 2.317 | 2.467 |

It may be seen from Table 2 that, the circumferential arc length of the power transmission cables 1 in the cold region will be increased to 2.467 times if the predetermined turning angle θ is up to 10 degrees.

The circumferential arc length of the main power transmission cables 1 in the cold region is increased, such that the cold air at a boundary layer of the wall surface of the tower barrel 5 with a whole arc length of 2.467 times of the original arc length is disturbed, and cold air caused to participate in the heat exchange is increased greatly. In the conventional technology, a group of power transmission cables 1 are arranged vertically, and air between the power transmission cables 1 and the wall of the tower barrel 5 is cooled by the wall of the tower barrel 5 while being heated by the power transmission cables 1, and gradually rises, and influencing range (a small circumferential arc length) is also limited, which is only about 1/2.4 of the influencing range in the present application. The "stored cold quantity" at the shady side inner wall of the tower barrel is great, but it is not utilized in the conventional technology. In another aspect, a large area of cold air is caused to perform convection heat exchange with the cables and dissipate heat to the shady side inner wall of the tower barrel, and the air performs natural convection heat exchange with the shady side inner wall of the tower barrel 5 in a large area. According to the newton's cooling equation, $\phi_c = hA(t_f - t_w)$ (theoretical basis of the present application), the cold air in a large area (A is increased to two times above) is used indirectly to absorb heat of the power transmission cables 1, so as to transfer the heat to the wall of the tower barrel 5 with a large area by the convection heat exchange, thus the heat exchange speed is improved due to the large area, thereby effectively reducing the temperature of the power transmission cables 1. In the equation, $\phi_c$ is the convection heat exchange speed, $t_f$ is an average air temperature, $t_w$ is the temperature of the inner wall of the tower barrel 5, A is a contact area for the convection heat exchange, and h is a surface heat transfer coefficient when the air contacts the wall surface of the tower barrel 5.

Figure 6:
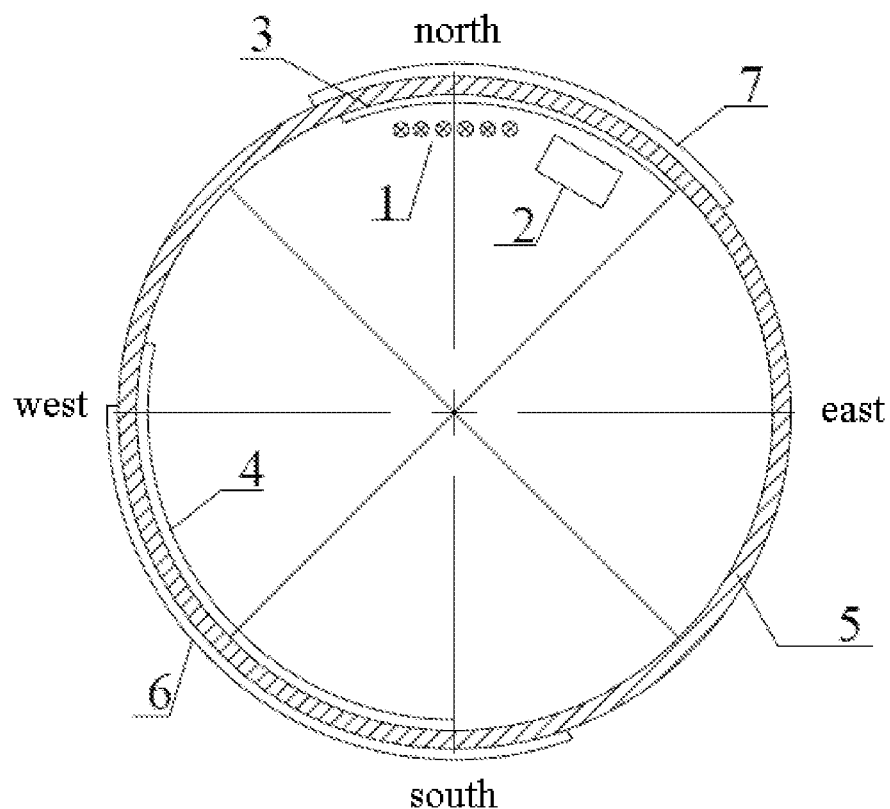
FIG. 6 is a schematic view showing the cross section of a heat transfer and dissipation system according to an embodiment of the present application.
Figure 7:
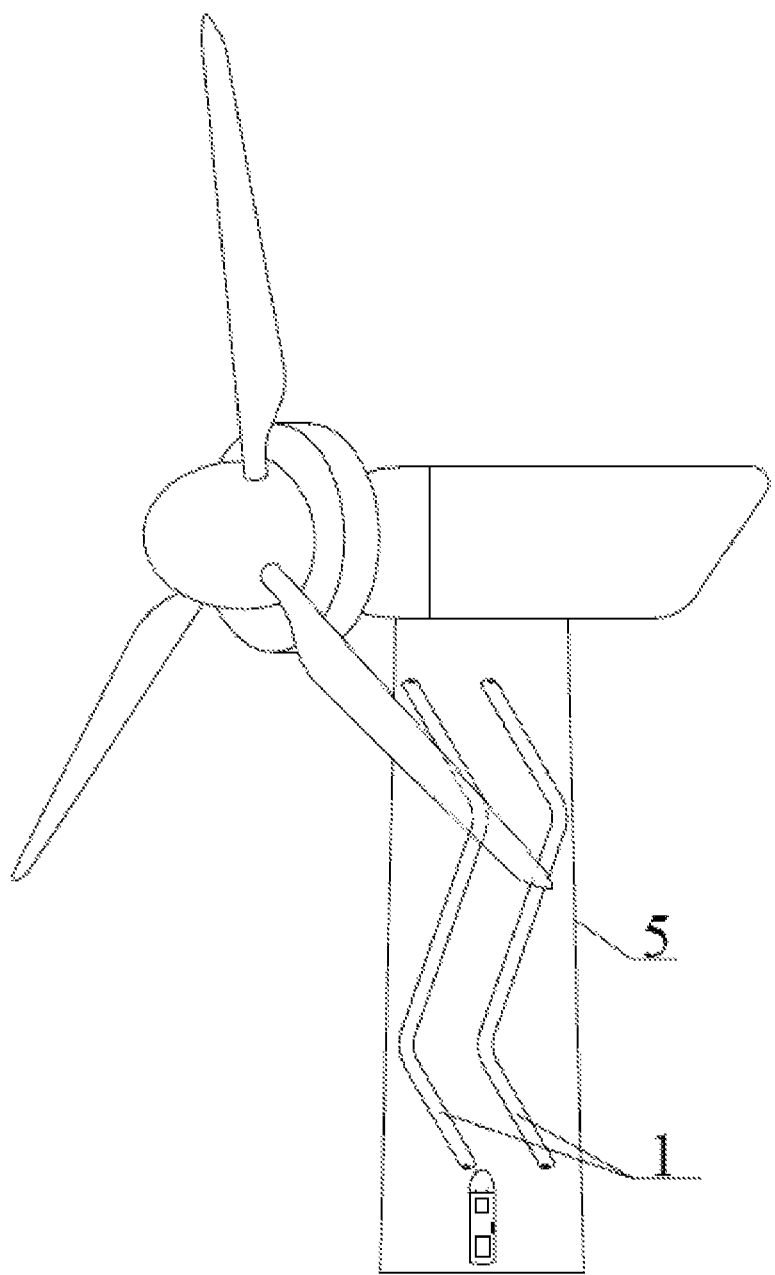
FIG. 7 and FIG. 8 schematically show laying solutions of a power transmission cable in a tower barrel according to the embodiment of the present application.
Figure 8:
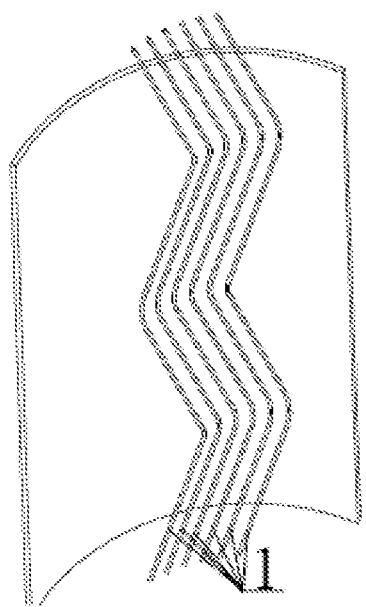

As shown in FIG. 6, in this embodiment, a heat radiation absorption coating 3 is provided on the shady side inner wall of the tower barrel 5. Preferably, a width or a circumferential arc length of the heat radiation absorption coating 3 is not less than the width or the circumferential arc length $L_1$ of the power transmission cables 1.

In FIG. 6, only six power transmission cables 1 are shown and are arranged to be in parallel with each other. FIG. 6 is only a schematic diagram. According to the value of the capacity of the generator set and the number of the power transmission cables 1. The specific arrangement may be changed and spaces between the power transmission cables 1 may also be adjusted accordingly. That is, the power transmission cables are not definitely arranged to be spaced apart in parallel with each other, and the power transmission cables may be arranged into an arc shape "⌒" having equal distances from the inner wall of the tower barrel 5, and may also be arranged into a curved wave shape "~".

In addition to the power transmission cables 1, other electrical device 2 such as a converter may be provided in the shady side region of the tower barrel 5. The positional relationship between the power transmission cables 1 and the electrical device 2 shown is only for the purpose of illustration. In the figure, and the positions of the power transmission cables 1 and the electrical device 2 may also be exchanged in the left-right direction upon the view, or the electrical device 2 may be adjusted clockwise towards east to be away from the power transmission cables 1.

According to differences of materials and fabrication processes, the heat radiation absorption coating 3 mainly includes the following four types. In the embodiments of the present application, different types of coatings may be used independently or combined.

(1) Paint Coating

The paint coating is generally prepared by a compressed air spraying method. Common paint coatings include:

$Fe_2O_3$-$Cr_2O_3$ coating, in which, $Fe_2O_3$, $Cr_2O_3$ and $MnO_2$ are used as a pigment, an organic silicon modified acrylic resin is used as a binder, and an absorptivity-emissivity ratio of the coating may reach 3.26;

PbS (dendritic crystal) coating, in which, dendritic crystal PbS with 0.1 μm is used as a pigment, an ethylene propylene rubber or a fluorine resin is used as a binder, an absorptivity ranges from 0.85 to 0.91, and an emissivity ranges from 0.23 to 0.40;

Silica sol heat absorbing coating, in which, silica sol is used as a binder, Fe powder is used as a color body, and the coating has a low cost, good weather resistance and water proofness, an absorptivity of 0.94 and an emissivity of 0.41;

Phthalocyanine green coating, in which, a pigment component is $Fe_3CuO_5$, and the coating has a good decorative performance and a high absorptivity-emissivity ratio; and Black chromium selective absorption coating prepared by a powder flame spraying method, which has a simple process, a low cost, stable performance, good spectrum selectivity, a heat radiation absorptivity of the black chromium selective absorption coating is 0.91, and an emissivity of the black chromium selective absorption coating is 0.15.

(2) Vacuum Plating Coating

The vacuum plating coating is prepared by vacuum evaporation and magnetron sputtering technology, for example a PbS/Al/Al coating prepared by direct evaporation. Coatings prepared by the magnetron sputtering technology include: a stainless steel-carbon/copper coating, an AlCN coating, an $AlN_xO_y$ coating and a Ni—Cr coating and a multilayer gradient aluminium nitrogen aluminium (Al—N/Al) coating. The vacuum plating coating further includes a metal ceramic composite coating prepared by radio-frequency sputtering, which is mainly applied in a high temperature field, and is a new process developed in recent years, for example, a $Ni-Al_2O_3$ coating; a $Wu-AlN_x$ coating, which is a metal ceramic composite coating obtained by doping metal particles such as Wu and chromium into an aluminum nitride medium; a $Ni:SiO_2$ metal ceramic absorption coating, in which, a volume ratio of Ni on a surface of the coating is 10% and gradually changes to 90% at the bottom of the coating, and the coating has a thickness ranging from 100 nm to 170 nm, an absorptivity of the coating is 0.96 and an emissivity of the coating ranges from 0.03 to 0.14; an aluminium oxide adoping molybdenum (Mo—$Al_2O_3$) metal ceramic coating, $Al_2O_3$ is used as an antireflection layer, a dual layer metal ceramic coating of Mo—$Al_2O_3$ is used as an absorption layer, Mo or Cu is used as an antireflection layer, the coating has a stable performance at 350 Celsius degrees, and an absorptivity of the coating is 0.96 and an emissivity of the coating is 0.11.

(3) Electrochemical Conversion Coating

Common electrochemical coatings include: an aluminum anode oxide coating, a CuO conversion coating and a steel anode oxide coating. Such coatings generally have an absorptivity ranging from 0.88 to 0.95 and an emissivity ranging from 0.15 to 0.32. The aluminum anode oxide coating has a good spectrum selectivity, corrosion-resistance and light resistance. The CuO conversion coating has a layer of black suede, and the performance of the coating is apt to be degraded if the black suede is damaged. The steel anode oxide coating has good ultraviolent-resistance and moisture resistance. Common electrochemical coatings further include a Mo black chemical conversion coating which has a maximum absorptivity of 0.87 and an emissivity ranging from 0.13 to 0.17.

(4) Electroplating Coating

Common electroplating coatings mainly include: a black nickel coating, a black chromium coating and a black cobalt coating and so on, which all have good optical performances. The black chromium coating and the black nickel coating have the best performances, and their absorptivity-emissivity ratio ($\alpha/\varepsilon$) is close to 6 to 13. However, the electroplating black chromium has a high production cost, and Cr6+ the plating solution pollutes the environment. Producing the electroplating black nickel consumes low energy and the electroplating black nickel has a low production cost, and no toxic substance exists in the plating solution. However, the black nickel plating coating is thin, and has poor thermal stability and poor corrosion resistance. An absorptivity of the black nickel plating coating can be up to 0.93, and the black nickel plating coating has strong durability, strong thermal stability and strong anti-corrosion capability. Since being sulfur-free, the developed black nickel-tin alloy coating can overcome the defects of the black nickel plating coating.

Furthermore, a thermal radiation and dissipation coating 7 is further provided on a shady side outer wall of the tower barrel 5. The thermal radiation and dissipation coating 7 has the high infrared emissivity, which can facilitate the heat being released efficiently into a surrounding environment from the tower barrel 5 in a heat radiation manner, thereby reducing the temperature of the tower barrel 5.

It can be known from FIG. 4 and FIG. 5 that, the sun radiation has directivity and temporality, and mainly focuses on a horizontal surface (a top surface), an east vertical surface and a west vertical surface. After the sun radiates, the temperatures at the top surface and a sunny side from east to west of the tower barrel 5 are higher than the temperature at the north shady side of the tower barrel 5 after noon.

In this embodiment, a heat radiation absorption coating 3 is provided on the shady side inner wall of the tower barrel 5 and the thermal radiation and dissipation coating 7 is provided on the outer wall of the tower barrel 5, thus, a low temperature characteristics of the north shady side is further utilized for enhancing the absorption of heat radiation of the power transmission cables 1, and the north heat dissipation channel is opened, thereby enhancing heat dissipation effect.

The thermal radiation and dissipation coating 7 is for example made of a sun heat reflection and insulation paint, such as an existing RLHY-A05 type of heat reflection and insulation paint, which is also arranged on the shady side outer wall. The sun heat reflection and insulation paint is a high environmental-protection type of reflection heat insulation filler, which mainly includes hollow glass micro-bead and infrared emission split and combines a high-quality inorganic modified resin emulsion, and a compact vacuum layer is formed on a surface of a substrate, which has advantages of high efficiency, thin layer, decoration, waterproof, fire protection, anti-corrosion and insulation and so on. The paint has functions of reflection, radiation and hollow micro-bead heat insulation, and can perform a high rate of reflection on infrared and ultraviolet of the sun in a range of 400 nm to 2500 nm. The paint can also prevent heat of the sun from accumulating and the temperature from rising, and can radiate heat in a cloudy day and at night so as to dissipate heat and reduce the temperature, thereby decreasing a surface temperature of the object. Meanwhile, the hollow micro-bead with an extremely low heat conduction coefficient is added into the paint for isolating energy transfer, thus external heat can be isolated from transferring into the object even if the ambient air temperature is high. The three functions ensure that the temperature of the object coated with the paint is decreased and the inner space of the object can be maintained in a constant temperature state.

Figure 13:
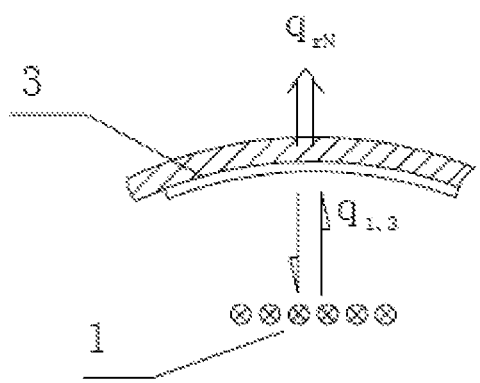
FIG. 13 is a schematic diagram showing a net heat transfer when radiation heat exchange between a shady side inner wall coating of the envelop enclosure and a surface of power transmission cables in the heat transfer and dissipation system according to the embodiment of the present application is simplified.
Figure 14:
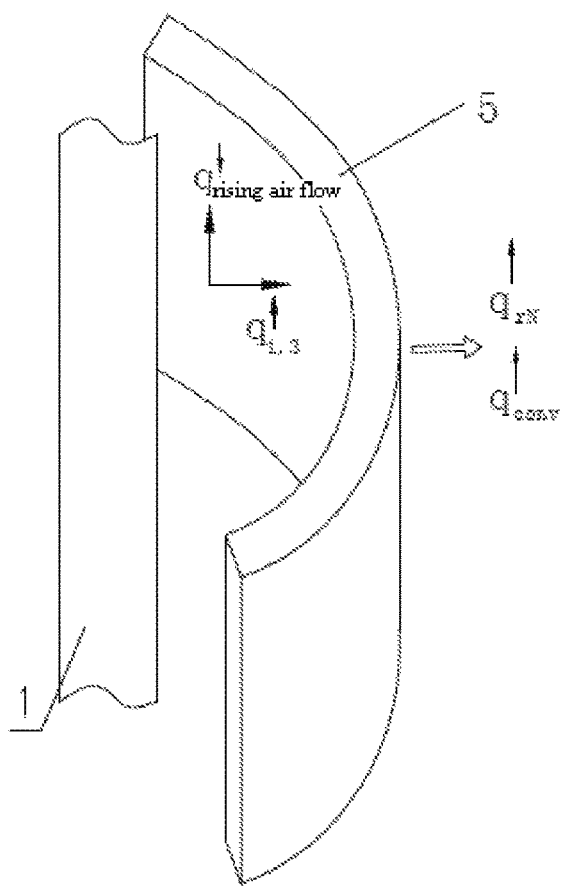
FIG. 14 is a schematic diagram showing radial acquiring and transferring heat flow in the shady side inner wall coating of an envelop enclosure in a heat transfer and dissipation system according to an embodiment of the present application.

FIG. 13 and FIG. 14 show that the power transmission cables 1 transfer heat and dissipate heat to the shady side in a radial direction by means of the heat radiation absorption coating 3 in this embodiment. An outer surface temperature of the power transmission cables 1 is higher than an inner surface temperature of the wall of the tower barrel 5 close to the north side in operation, if the power transmission cables 1 and the electrical device 2 are not located here or do not operate, the outer wall, at the north side, of the tower barrel 5 is not directly heated by the sun radiation, and there are only environmental radiation and earth surface radiation, thus the temperature of the inner wall of the tower barrel 5 is low. According to the blackbody radiation biquadrate law (stefan-boltzmann law, which is the second theoretical basis for the present application), the larger a temperature difference between heat sources emitting radiation is, the more easily the heat is transferred from a high temperature heat source to a low temperature heat source, and a radiation heat transfer speed is proportional to a difference between a biquadrate of the surface temperature of the power transmission cables 1 and a biquadrate of the inner surface temperature of the wall of the tower barrel 5 at the shady side.

FIG. 13 shows a local radiation network diagram between the power transmission cables 1 and the coating on the inner wall, at the north side, of the tower barrel 5 in (in order to emphasize the principal contradiction, the solution is simplified, the inner wall of the tower barrel 5 at the sunny side has been coated with a material having a low emissivity, and the influence to the coating here is ignored). In FIG. 13, $q_{1,3}$ indicates a radiation heat exchange speed between the power transmission cables 1 and the inner wall of the tower barrel 5, $q_{conv}$ indicates a radiation heat exchange speed of the shady side outer wall of the tower barrel 5, $q_{conv}$ indicates an air convection heat exchange speed of the shady side outer wall of the tower barrel 5 and a natural environment out of the tower barrel, and $q_{rising\ air\ flow}$ indicates a heat flow speed of air around the power transmission cables 1.

In order to further facilitate dissipating heat by the power transmission cables 1, an infrared coating with a high emissivity may be coated on a surface of the power transmission cables 1 (i.e., increasing the emissivity ε).

In order to reduce heat resistance on radiation surfaces of heat sources at both sides, spaces between the power transmission cables 1 may be increased appropriately or the power transmission cables 1 may be arranged in an alternate manner, thereby reducing radiation heat resistance of spaces between the power transmission cables, and thus increasing a speed of the power transmission cables 1 releasing net radiation heat flow to the coating.

As compared with a solution that the power transmission cables 1 are arranged in a place rather than the north side of the wall of the tower barrel 5, in which the temperature difference between the power transmission cables 1 and the wall of the tower barrel 5 is reduced, and a temperature of air sandwiched therebetween is increased, the air temperature of the north wall surface of the tower barrel 5 is low, which may facilitate expulse and replace the hot air around the surface of the power transmission cables 1, thereby achieving natural convection heat exchange.

In the embodiment of the present application, the power transmission cables 1 are arranged in a region close to the wall, at the north side, of the tower barrel 5, the cold air with a low temperature between the power transmission cables 1 and the wall, at the north side, of the tower barrel 5 is heated. Specifically, $q_{rising\ air\ flow}$ indicates heat acquired from the surface of the power transmission cables 1 by the rising air flow. As compared with the solution that the power transmission cables 1 are arranged in other directions, in this embodiment, a transmission capability of a radial heat flow transmission channel of the inner wall, at the north side, of the tower barrel 5 is utilized, the heat flow transmitted radially by means of the tower barrel 5 is increased, that is, $q_{1,3}\uparrow$; $q_{rising\ air\ flow}\downarrow$ indicates a weight of the hot air carrying heat and rising is reduced, that is, a speed of an air flow moving upward is reduced, the carried heat is reduced, and the heat rises in the horizontal direction, thereby increasing a horizontal radial transfer speed and the amount of the heat, which is one of innovations of the present application. Similarly, heat exchanged between the shady side wall of the tower barrel 5 and the surrounding environment of the outer wall of the tower barrel 5 by the convection heat dissipation gamy and the radiation heat exchange $q_{rN}$ is also increased.

Figure 15:
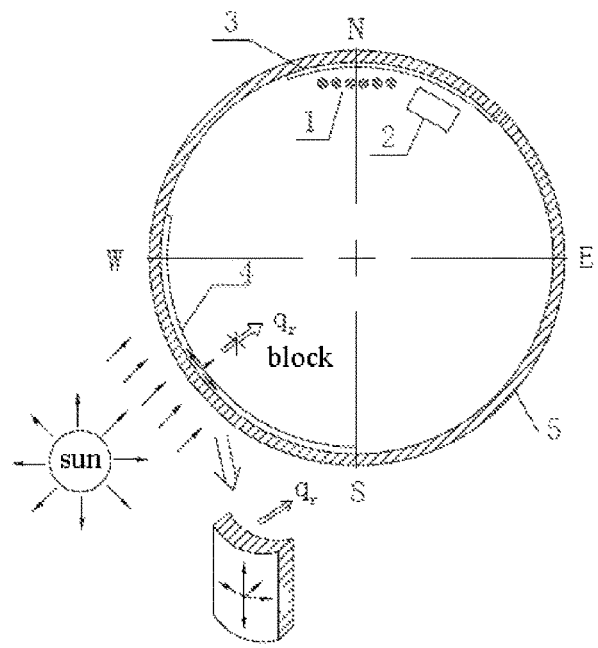
FIG. 15 is a diagram for analyzing a principle in which an inner surface of a tower barrel wall of the heat transfer and dissipation system according to the embodiment of the present application blocks a radial heat flow to cooperate with a shady side to perform heat transfer and cooling.

As shown in FIG. 15, a "micro-element" is taken from the wall of the sun surface tower barrel 5. Both sides of the "micro-element" in a radial direction are heat insulation coatings of the tower barrel 5. An arrow in the "micro-element" indicates a transfer direction of a heat flow converted from the sun radiation energy which is obtained by the outer side of the wall of the tower barrel 5. A thermal diffusivity of the metal is high, the thermal diffusivity $\alpha=\lambda/\rho C$ (λ-heat conduction coefficient, ρ-density, C-specific heat capacity). Table 3 provides thermal diffusivities of several types of heat insulation and light-weight materials. Specifically, a thermal diffusivity 0.5% C of the metal steel is dozens of times even hundreds of times of thermal diffusivities of other materials. It is put forward by the inventor that, when the outer surface of the tower barrel 5 is prevented from absorbing sun radiation, heat insulation measures are further taken on the inner surface of the wall of the tower barrel 5 accordingly, which prevents the inner surface of the wall of the tower barrel 5 from emitting heat into the inner space of the tower barrel 5, and prevents emitting heat rays to the power transmission cable 1 and the electrical device 2 in the tower barrel 5.

TABLE 3 thermal diffusivities of several types of heat insulation and light-weighted materials

| name of materials | steel 0.5% C | rock wool board | cement perlite products | perlite powder material | glass wool | Polystyrene plastic |
|---|---|---|---|---|---|---|
| thermal diffusivity $\alpha \times 10^7$ (m²/s) | 148.26 | 3.82 | 2.48 | 2.31 | 7.73 | 0.71-1.1 |

Therefore, in this embodiment, a first thermal insulation layer 6 is provided on a sunny side outer wall of the tower barrel 5, and a second thermal insulation layer 4 is provided on a sunny side inner wall of the tower barrel 5. Preferably, the first thermal insulation layer 6 is a heat reflection and insulation coating. By the heat reflection and insulation coating, the tower barrel 5 is prevented from absorbing heat radiation from the sun and a surrounding environment, and heat is suppressed from transferring into the tower barrel 5 from the sun and the surrounding environment by heat radiation.

As shown in FIG. 15, when the sun radiation heat absorbed by the tower barrel 5 reaches the second thermal insulation layer 4, the heat can only be transferred in a circumferential direction and a vertical height direction of the tower barrel 5, since the heat insulation function of the second thermal insulation layer 4 blocks a path for transferring heat into the tower barrel radially, thereby preventing a temperature in the tower barrel 5 from rising due to the sun radiation and being beneficial to dissipate heat by heat generation devices such as the power transmission cables 1 laid in the tower barrel 5.

Preferably, the second thermal insulation layer 4 is a heat radiation and insulation coating with an infrared low emissivity coated on the tower barrel 5. The heat radiation and insulation coating is made of a paint with a thermal Infrared low emissivity including a binder and a pigment with a low emissivity function. The binder includes a chlorinated polyethylene resin, and the pigment with the low emissivity function includes Al powder, Zn powder, Cu powder, Ni powder or a single crystal silicon. The coating with the infrared low emissivity on the inner surface of the tower barrel 5 "blocks" (significantly reduces) the heat flow in a radial inwards transferring channel by the heat radiation.

The second thermal insulation layer 4 may be implemented by the following solutions:

(1) a radiation shielding heat insulation board covered on the inner wall, such as an aluminum foil with a infrared low emissivity and a high reflectivity;

(2) a new nano intelligent thermal coating, wherein a thermal component of the coating is Hydro-NM-Oxide with an ultra-low heat conduction coefficient; and (3) a thermal insulation layer made by heat insulation and fire resistant materials. Table 4 shows thermal conductivities of several heat insulation and fire resistant materials, and the materials have thermal conductivities in a low range, thereby effectively preventing the heat from transferring into the envelop enclosure by the heat transfer.

TABLE 4

Thermal conductivities of heat insulation and fire resistant materials

| name of material | superfine glass wool felt | cement perlite product | micro-hole calcium silicate | slag wool |
|---|---|---|---|---|
| thermal conductivities $\lambda$ (w/m · k) | 0.033 | 0.0651 | 0.044 | 0.0674 |

Figure 16:
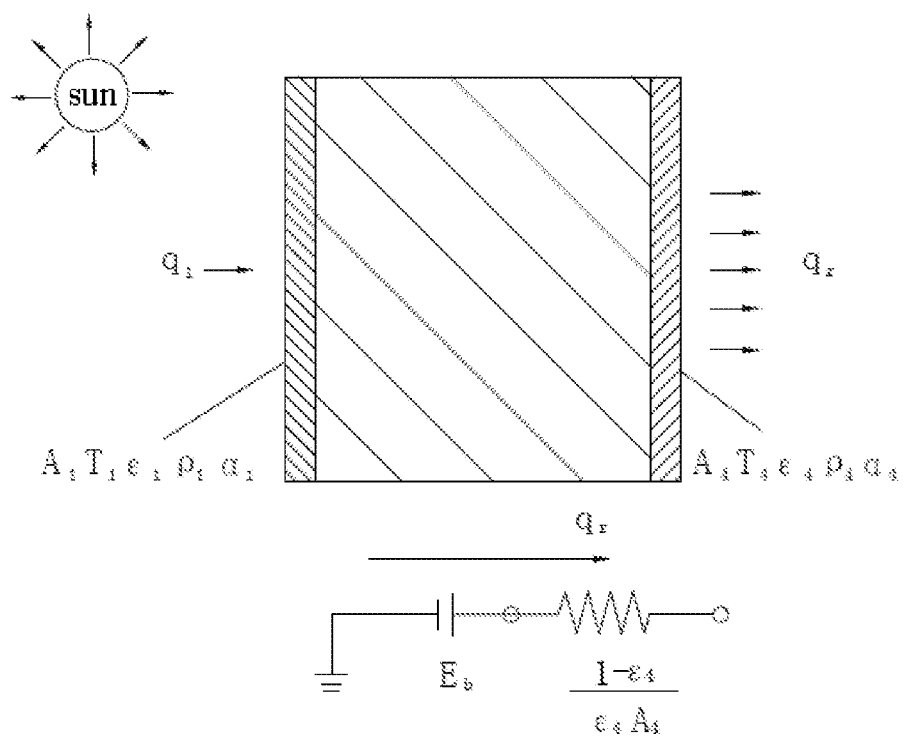
FIG. 16 is an equivalent unit network diagram of a heat source of the inner surface coating of the tower barrel wall of the heat transfer and dissipation system according to the embodiment of the present application.

FIG. 16 shows a heat source equivalent unit network and a surface radiation heat resistance of the second thermal insulation layer 4 of the inner surface. In FIG. 16, $A_1$ indicates an area of an outer wall coating of the tower barrel 5, $T_1$ indicates a temperature of the outer wall coating of the tower barrel 5, $\varepsilon_1$ indicates an emissivity of the outer wall coating of the tower barrel 5, $\rho_1$ indicates a reflectivity of the outer wall coating of the tower barrel 5, $\alpha_1$ indicates an absorptivity of the outer wall coating of the tower barrel 5, $q_r$ indicates a radiation heat flow of an inner wall coating of the tower barrel 5, $A_4$ indicates an area of the inner wall coating of the tower barrel 5, $T_4$ indicates a temperature of the inner wall coating of the tower barrel 5, $\varepsilon_4$ indicates an emissivity of the inner wall coating of the tower barrel 5, $\rho_4$ indicates a reflectivity of the inner wall coating of the tower barrel 5, and $\alpha_4$ indicates an absorptivity of the outer wall coating of the tower barrel 5. In FIG. 16, $E_b$ indicates a transmit power of the inner wall coating, corresponding to the temperature of the inner wall coating, and an equation $$\frac{1 - C_4}{\varepsilon_4 A_4}$$

indicates a surface radiation heat resistance of the inner wall coating. It may be seen from the equation that, the smaller the emissivity $\varepsilon_4$ of the second thermal insulation layer 4 functioning as the inner wall coating of the envelop enclosure body 5 is, the larger the surface radiation heat resistance of the second thermal insulation layer 4 is, and the better the heat insulation effect is. By means of a material with a low emissivity $\varepsilon_4$, for example, the emissivity $\varepsilon_4$ reducing from 0.8 to 0.1, the surface heat resistance is increased to 36 times of the original one, thereby reducing an effective radiation intensity of the coating surface.

Hereinafter the heat insulation mechanism and common material components of the first thermal insulation layer 6 which is implemented as a heat radiation and insulation coating are illustrated in detail.

1. Heat Insulation Mechanism of the Heat Reflection and Insulation Coating

The sun radiation may be divided into three parts according to the wavelength. The parts occupy different proportions in the total energy, as shown in FIG. 5. The sun energy mainly focuses on a visible light region and a near infrared light region in a range of 400-2500 nm. When the wavelength is 500 nm, the heat radiation of the sun is strongest. It may be seen from FIG. 5 that, the visible light and the near infrared light occupy 95% of the total radiation energy of the sun, therefore a surface temperature of the envelop enclosure such as the tower barrel 5 and a cabin under the sun radiation can be reduced in the case that the sun and the near infrared light are isolated, thereby reducing a cost of a device in the tower barrel 5 and the cabin for reducing the air temperature.

TABLE 5

Proportions of different wave bands of the sun occupying the total energy of the sun

| light region | wavelength (nm) | proportion % of occupying the total energy |
|---|---|---|
| ultraviolet light | 200-400 | 5 |
| visible light | 400-720 | 45 |
| near infrared light | 720-2500 | 50 |

Without influencing the appearance, the temperatures of the tower barrel 5 and the cabinet wall under the sun radiation can be reduced significantly by maximizing the reflection ratio of the near infrared light. The near infrared light occupies 50% of the total energy of the sun radiation, therefore a large part of heat radiation energy can be isolated when the near infrared radiation is suppressed. The sun heat reflection and insulation coating is a functional coating having an obvious reflection function on the near infrared radiation. In the coating, generally, particles with a reflection function on the near infrared radiation are coated on the substance, and the near infrared in the sun radiation is reflected and scattered into an external space, thereby reducing the temperature of the object surface and the inner environment under the heat radiation.

2. Basic Components of Heat Reflection and Insulation Coating

The heat reflection and insulation coating generally includes a resin and functional filler. The resin generally includes an organosilicon acrylic resin, a silicone-alkyd rein, an acrylic resin, an epoxy resin or a polyurethane resin.

For a hard substrate (metal, wall and so on), generally the heat reflection and insulation paint is directly coated on a surface of the substrate to insulate heat, and the heat insulation performance of the coating is influenced mainly by the type of the resin and the functional filler, particle size distribution, usage amount and the thickness of the coating. The resin is an essential component in the heat reflection and insulation material, which connects the functional particles with the substrate. The resin functions as a carrier for the functional particles. Different resins do not influence the sun heat reflection and insulation effect of the coating greatly. In practice, during an actual application process, a resin containing little heat absorbing groups such as C—O—C, C=O and O—H may be selected. Table 6 shows absorptivities of several different resin coatings to the sun, by taking $TiO_2$ as a filler.

TABLE 6

Heat absorptivities of several different resin coatings

| coating | absorptivity α |
|---|---|
| organosilicon acrylic resin | 0.19 |
| silicone-alkyd rein | 0.22 |
| acrylic resin | 0.24 |
| epoxy resin | 0.25 |
| polyurethane resin | 0.26 |

The functional filler is the most important component in the sun heat reflection and insulation coating. The common functional filter includes $TiO_2$, ZnO, $BaSO_4$, $CaCO_3$, $ZnO_3$, talcum powder, kaolin or hollow glass micro-bead, which is mainly used to reflect near infrared radiation in the sun radiation and reduce the heat absorptivity of the object surface. The functional filler contained in the sun heat reflection and insulation coating should have a high reflectivity and a low absorption to the sun radiation. Substance with a forbidden band width of Eg=0.5 to 1.8 eV absorbs near infrared radiation, and substance with a forbidden band width of Eg=1.8 to 3.1 eV absorbs visible light radiation. Therefore, in order to avoid absorbing the visible light and the near infrared light by the object, the forbidden band width Eg of the selected functional filter should be greater than 3.1 eV or less than 0.5 eV. Table 7 shows refractive indices (also referred to as refractivity or refraction) and forbidden band widths Eg of several fillers. Table 8 shows reflectivities (reflection ratios) of several white powder fillers for the near infrared radiation.

TABLE 7

Refractive indices and forbidden band widths Eg of typical fillers

| filler | $TiO_2$ (a rutile type) | $TiO_2$ (an anatase type) | ZnO | $Al_2O_3$ | $SiO_2$ | $Fe_2O_3$ |
|---|---|---|---|---|---|---|
| refractive index | 2.76 | 2.52 | 2.20 | 1.76 | 1.46 | 2.30 |
| Eg/eV | 3.05 | 3.05 | 3.40 | 8.30 | 8.80 | 3.10 |

In other embodiments, similar to the second thermal insulation layer 4, the first thermal insulation layer 6 may be designed as a thermal insulation layer in other forms.

TABLE 8

Reflectivities (reflection ratios) of white powder fillers to the near infrared radiation

| material | $TiO_2$ (a rutile type) | $TiO_2$ (an anatase type) | ZnO | $BaSO_4$ | $CaCO_3$ | $ZnO_3$ | talcum powder | kaolin | hollow glass micro-bead |
|---|---|---|---|---|---|---|---|---|---|
| reflectivity % | 80 | 79 | 45 | 32 | 48 | 59 | 45 | 46 | 44-48 |

In the embodiment of the present application, the power transmission cables 1 are laid as a bending shape in the vertical direction, the power transmission cable 1 is laid in a shady side region of the envelop enclosure, and the hear radiation absorption coating 3 and the thermal insulation layer are provided, thus, a low temperature environment with a low heat accumulation speed is created for the power transmission cables 1, and a heat dissipation channel with an increased heat dissipation speed on the convection heat exchange, radiation heat exchange and heat conduction and exchange is created, such that the heat dissipation speed of the power transmission cables 1 is improved significantly, heat generated during the operation of the power transmission cables 1 is dissipated in a timely manner, the power transmission cables 1 is ensured to operate in a low normal temperature for a long time, thereby ensuring reliability of power transmission and extending the service life of the power transmission cables 1.

Second Embodiment

A heat transfer and dissipation system according to this embodiment has the same invention concept, same basic implementation, same function principles and same beneficial effects as those of the first embodiment. For briefness, only the difference with the first embodiment is described here, and for the same part as the first embodiment, reference can be made to the description of the first embodiment.

This embodiment differs from the first embodiment in that: the power transmission cables 1 are laid as a different bending shape in the vertical direction.

Figure 17:
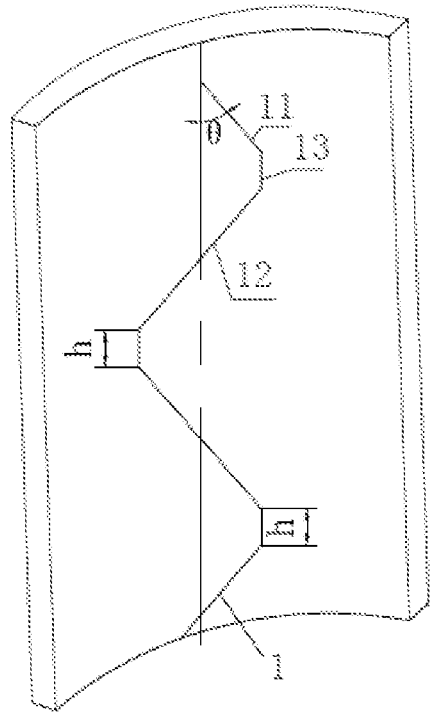
FIG. 17 schematically shows a laying solution of power transmission cables in the heat transfer and dissipation system according to a second embodiment of the present application.

As shown in FIG. 17, in this embodiment, the power transmission cables 1 include multiple twisted segments arranged from top to bottom in the vertical direction. Each of the multiple twisted segments includes two inclined sub-segments (i.e., a first inclined sub-segment 11 and a second inclined sub-segment 12) and a transition sub-segment 13 between the two inclined sub-segments. An angle between the vertical direction and the first inclined sub-segment 11 and between the vertical direction and the second inclined sub-segment 12 is a predetermined turning angle θ. The angle between the first inclined sub-segment 11 and the vertical direction may be the same as the angle between the second inclined sub-segment 12 and the vertical direction or not equal to the angle between the second inclined sub-segment 12 and the vertical direction. Preferably, the angles may preferably be greater than or equal to 5 degrees and smaller than or equal to 10 degrees.

In this embodiment, the transition sub-segment 13 is a vertical transition sub-segment. A clamping plate 9 configured to clamp the power transmission cables 1 is laid in a joining portion between the first inclined sub-segment 11 and the transition sub-segment 13 and a joining portion between the second inclined sub-segment 12 and the transition sub-segment 13.

Ratios of lengths of the first inclined sub-segment 11, the second inclined sub-segment 12 and the transition sub-segment 13 may be adjusted in any manner according to specific cases, which are not limited in the present application.

Third Embodiment

A hear transfer and dissipation system in this embodiment has the same invention concept, same basic implementation, same function principles and same beneficial effects as those in the first embodiment. For briefness, only the difference of this embodiment from the first embodiment is described here, and for the same part as the first embodiment, reference can be made to the description of the first embodiment.

This embodiment differs from the first embodiment in that: the power transmission cables 1 are laid as a different bending shape in the vertical direction.

Figure 18:
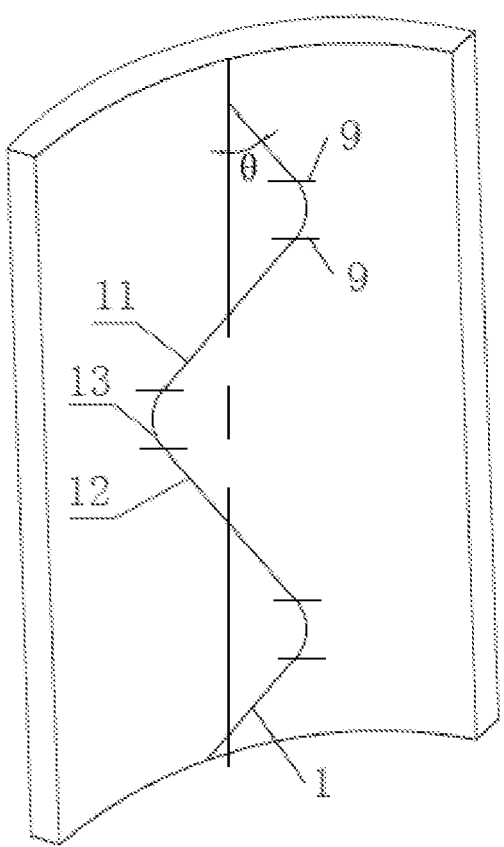
FIG. 18 schematically shows a laying solution of power transmission cables in the heat transfer and dissipation system according to a third embodiment of the present application.

As shown in FIG. 18, in this embodiment, the power transmission cables 1 also include multiple twisted segments arranged from top to bottom in the vertical direction. Each of the multiple twisted segments includes two inclined sub-segments (i.e., a first inclined sub-segment 11 and a second inclined sub-segment 12) and a transition sub-segment 13 between the two inclined sub-segments. An angle between the vertical direction and the first inclined sub-segment 11 and between the vertical direction and the second inclined sub-segment 12 is a predetermined turning angle θ.

This embodiment differs from the second embodiment in that: the transition sub-segment 13 is designed as an "arc-shaped segment", and this structure has a beneficial effect of thermal expansion and stretching in addition to the beneficial effects of the above embodiment.

The specific embodiments of the present application are described hereinbefore, but the scope of the present application is not limited thereto. Any variations or substitutions readily envisaged by the person skilled in the art within the scope of the disclosed technology should fall within the scope of the present application. Therefore, the scope of the present application should be based on the scope of claims.

The invention claimed is:

1. A heat transfer and dissipation system based on an envelop enclosure, comprising:
   the envelop enclosure, and
   power transmission cables,
   wherein the power transmission cables are laid as a plurality of repeated bending shapes in a vertical direction;
   wherein the power transmission cables are arranged as a saw shape bending repeatedly downward with a predetermined turning angle.

2. The heat transfer and dissipation system based on the envelop enclosure according to claim 1, wherein the power transmission cables are laid in a region close to an inner wall, at a shady side, of the envelop structure.

3. The heat transfer and dissipation system based on the envelop enclosure according to claim 1, wherein the power transmission cables comprise:
   a plurality of twisted segments arranged from top to bottom in a vertical direction,
   wherein each of the plurality of twisted segments comprises at least two inclined sub-segments and a transition sub-segment arranged between the at least two inclined sub-segments, and an angle between the vertical direction and each of the inclined sub-segments is the predetermined turning angle.

4. The heat transfer and dissipation system based on the envelop enclosure according to claim 3, wherein the transition sub-segment comprises a vertical transition sub-segment and an arc-shaped transition sub-segment.

5. The heat transfer and dissipation system based on the envelop enclosure according to claim 4, wherein a clamping plate configured to clamp the power transmission cables is arranged in a joining portion between each of the at least two inclined sub-segments and the transition sub-segment.

6. The heat transfer and dissipation system based on the envelop enclosure according to claim 3, wherein the envelop enclosure has an arc-shaped inner wall in a horizontal cross section, and each of the at least two inclined sub-segments extends in a bending manner with respect to the arc-shaped inner wall.

7. The heat transfer and dissipation system based on the envelop enclosure according to claim 1, wherein the envelop enclosure has an arc-shaped inner wall in a horizontal cross section, and the power transmission cables extend in a twisted manner with respect to the arc-shaped inner wall.

8. The heat transfer and dissipation system based on the envelop enclosure according to claim 7, wherein a clamping plate configured to clamp the power transmission cables is arranged at each of turning points of the power transmission cables.

9. The heat transfer and dissipation system based on the envelop enclosure according to claim 8, wherein at least another clamping plate configured to clamp the power transmission cables is arranged between every two of the turning points of the power transmission cables, and the power transmission cables between adjacent two clamping plates is linear.

10. The heat transfer and dissipation system based on the envelop enclosure according to claim 1, wherein the predetermined turning angle is greater than or equal to 5 degrees and smaller than or equal to 10 degrees.

11. The heat transfer and dissipation system based on the envelop enclosure according to claim 1, wherein a thermal radiation absorption coating is provided in at least a region opposite to the power transmission cables on an inner wall, at a shady side, of the envelop enclosure;
   a first thermal insulation layer is provided on at least an outer wall, at a sunny side, of the envelop enclosure;
   a second thermal insulation layer is provided on an inner wall, at the sunny side, of the envelop enclosure; and/or
   a thermal radiation and dissipation coating is provided on an outer wall, at the shady side, of the envelop enclosure.

12. A wind power generator set, comprising the heat transfer and dissipation system based on the envelop enclosure according to claim 1, wherein the envelop enclosure is a tower barrel.

13. The heat transfer and dissipation system based on the envelop enclosure according to claim 3, wherein the predetermined turning angle is greater than or equal to 5 degrees and smaller than or equal to 10 degrees.

14. The heat transfer and dissipation system based on the envelop enclosure according to claim 4, wherein the predetermined turning angle is greater than or equal to 5 degrees and smaller than or equal to 10 degrees.

15. The heat transfer and dissipation system based on the envelop enclosure according to claim 5, wherein the predetermined turning angle is greater than or equal to 5 degrees and smaller than or equal to 10 degrees.

16. The heat transfer and dissipation system based on the envelop enclosure according to claim 6, wherein the predetermined turning angle is greater than or equal to 5 degrees and smaller than or equal to 10 degrees.

17. The heat transfer and dissipation system based on the envelop enclosure according to claim 7, wherein the predetermined turning angle is greater than or equal to 5 degrees and smaller than or equal to 10 degrees.

18. The heat transfer and dissipation system based on the envelop enclosure according to claim 8, wherein the predetermined turning angle is greater than or equal to 5 degrees and smaller than or equal to 10 degrees.

19. The heat transfer and dissipation system based on the envelop enclosure according to claim 2, wherein a thermal radiation absorption coating is provided in at least a region opposite to the power transmission cables on an inner wall, at a shady side, of the envelop enclosure;
- a first thermal insulation layer is provided on at least an outer wall, at a sunny side, of the envelop enclosure;
- a second thermal insulation layer is provided on an inner wall, at the sunny side, of the envelop enclosure; and/or a thermal radiation and dissipation coating is provided on an outer wall, at the shady side, of the envelop enclosure.

* * * * *